(12) United States Patent
Mehringer et al.

(10) Patent No.: US 9,535,562 B2
(45) Date of Patent: Jan. 3, 2017

(54) COGNITIVE LOAD REDUCTION AND FIELD OF VIEW ENHANCING STANDARDIZED GRAPHICAL USER INTERFACE (GUI) OVERLAY GENERATING SYSTEM OR SYSTEMS THAT INCLUDE ELEMENTS THAT CORRELATE VARIOUS DEVICE, EVENT, OR OPERATION INPUTS WITH COMMON GUI OVERLAY GENERATION MODULES AND GROUP RELATED GUI ELEMENTS ACROSS OVERLAYS ALONG WITH ASSOCIATED METHODS

(71) Applicants: Todd Mehringer, Jasper, IN (US); Bret Mehringer, Jasper, IN (US); Peter Avenatti, Bloomington, IN (US); Mark Rondina, Bloomfield, IN (US)

(72) Inventors: Todd Mehringer, Jasper, IN (US); Bret Mehringer, Jasper, IN (US); Peter Avenatti, Bloomington, IN (US); Mark Rondina, Bloomfield, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 830 days.

(21) Appl. No.: 13/863,051

(22) Filed: Apr. 15, 2013

(65) Prior Publication Data
US 2013/0283163 A1    Oct. 24, 2013

Related U.S. Application Data

(60) Provisional application No. 61/637,499, filed on Apr. 24, 2012.

(51) Int. Cl.
*G06F 3/048* (2013.01)
*H04N 5/232* (2006.01)
*H04N 7/18* (2006.01)
*G06F 3/0481* (2013.01)

(52) U.S. Cl.
CPC ............ *G06F 3/048* (2013.01); *G06F 3/0481* (2013.01); *H04N 5/23216* (2013.01); *H04N 5/23245* (2013.01); *H04N 5/23293* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 2011/0012719 | A1* | 1/2011 | Hilger | H04N 7/181 340/435 |
| 2013/0046461 | A1* | 2/2013 | Balloga | G01C 3/04 701/438 |
| 2013/0222666 | A1* | 8/2013 | Rydenhag | H04N 5/23293 348/333.02 |

* cited by examiner

Primary Examiner — Matt Kim
Assistant Examiner — Daniel Samwel
(74) *Attorney, Agent, or Firm* — Christopher A. Monsey

(57) ABSTRACT

A device or computer program that takes the data and/or video from separate sensory devices and then combines this information for display in a standardized, but user configurable Graphical User Interface. Since each input device is paired with a device driver to properly parse the data for the input device, new devices may be added by writing new device drivers. The GUI has a standard set of elements that the individual user can modify to suit their personal preferences and needs. Since the Graphical User Interface is standardized, the user knows where to look for the data that they need no matter which sensory device is attached.

10 Claims, 39 Drawing Sheets

```
away3d
└──▶primitive
        ├──▶AbstractPrimitive.as
        ├──▶Arrow.as
        ├──▶BezierPatch.as
        ├──▶Cone.as
        ├──▶Cube.as
        ├──▶CubeMappingType.as
        ├──▶CurveLineSegment.as
        ├──▶Cylinder.as
        ├──▶GeodesicSphere.as
        ├──▶GridPlane.as
        ├──▶LineSegment.as
        ├──▶NURBS.as
        ├──▶Plane.as
        ├──▶ReflectivePlane.as
        ├──▶RegularPolygon.as
        ├──▶RoundedCube.as
        ├──▶SeaTurtle.as
        ├──▶Skybox.as
        ├──▶Skybox6.as
        ├──▶Sphere.as
        ├──▶TextField3D.as
        ├──▶Torus.as
        ├──▶TorusKnot.as
        ├──▶Triangle.as
        ├──▶Trident.as
        ├──▶WireCone.as
        ├──▶WireCube.as
        ├──▶WireCylinder.as
        ├──▶WirePlane.as
        ├──▶WireRegularPolygon.as
        ├──▶WireSphere.as
        ├──▶WireTorus.as
        ├──▶data
        │       ├──▶CubeMaterialsData.as
        │       ├──▶PatchData.as
        │       └──▶WeightedVertex.as
        └──▶utils
                └──▶CubeFaces.as
```

Fig. 24

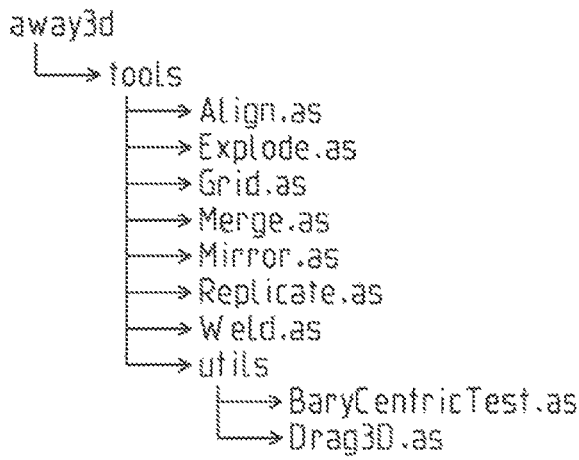
Fig. 27
Fig. 28
```
package controller
    import org.robotlegs.mvcs.Command;
    import services.FLIRService;
    public class FLIRServiceStartupCommand extends Command
        [Inject]
        public var flirService:FLIRService;
        override public function execute():void
            flirService.startService();
```
Fig. 29

```
package controller import events.AzUpdateEvent;
    import events.CameraUpdateEvent;
    import events.ElUpdateEvent;
    import events.FOVEvent;
    import events.FeedbackMessage;
    import events.NemaUpdateEvent;
    import events.TargetUpdateEvent;
    import model.Interface3Model;
    import org.robotlegs.mvcs.Command;
    public class NemaParseCommand extends Command

[Inject]
        public var nemaUpdate:NemaUpdateEvent;
        [Inject]
        public var interfaceModel:Interface3Model;

override public function execute():void var messageString:String = nemaUpdate.nema;
            //Decipher the type of string and send it to the
            //correct parser private function parseSSS(msg:String):void //Update interfaceModel with the parts of the Camera
            //Status, aka systemMode, bitStatus, trackerMode &
            //videoSensor. Then send videoSensor to
            //CamerUpdateEvent.

private function parseSPD(msg:String):void

//Update interfaceModel with azimuth and elevation.
            //Then send azimuth to AzUpdateEvent and elevation to
            //ElUpdateEvent.

private function parseVSD(msg:String):void

//convert the FLIR FOV scale to a 0-1 scale
            //pass the fov to the model private function parseRNG(msg:String):void //pass the range to the model.
            //send range to TargetUpdateEvent
```

Fig. 30

```
events
    ├──→ AzUpdateEvent.as
    ├──→ CameraUpdateEvent.as
    ├──→ ElUpdateEvent.as
    ├──→ FeedbackMessage.as
    ├──→ FOVEvent.as
    ├──→ NemaUpdateEvent.as
    └──→ TargetUpdateEvent.as
```

Fig. 31

```
package events import flash.events.Event;
    public class AzUpdateEvent exends Event public static const AZIMUTH_UPDATE:STRING="AZIMUTH_UPDATE";
        private var _azimuth:Number;
        public function get azimuth () :Number return _azimuth;

public function AzUpdateEvent(newAz:Number)

super(AZIMUTH_UPDATE);
            _azimuth = newAz;
```

Fig. 32

```
package events import flash.events.Event;
    public class CameraUpdateEvent extends Event public static const UPDATE_CAMERA:String="UPDATE_CAMERA";
        private var _cameraType:String;

public function get cameraType():String return _cameraType;

public function CameraUpdateEvent(newCamType:String):void super(UPDATE_CAMERA);
            _cameraType = newCamType;
```

Fig. 33

```
package events import flash.events.Event;
    public class ElUpdateEvent extends Event public static const ELEVATION_UPDATE:String = "ELEVATION_UPDATED";

private var _elevation:Number;
        public function get elevation () :Number
            return _elevation;
        public function ElUpdateEvent (newEl:Number)
            super(ELEVATION_UPDATE);
            _elevation = newEl;
```

Fig. 34

```
package events import flash.events.Event;
    public class FeedbackMessage extends Event public static const RANGE_ERROR:String = "RANGE_ERROR";
        private var _message:String;
        public function get message () :String
            return _message;
        public function FeedbackMessage (message:String)
            super (type) ;
            _message = message;
```

Fig. 35

```
package events import flash.events.Event;
    public class FOVEvent extends Event public static const FOV_UPDATE:String = "FOV_UPDATE";
        private var _fieldofview:Number;

public function get fieldofview():Number
            return _fieldofview;
        public function FOVEvent (newFOV:Number)
            super(FOV_UPDATE);
            _fieldofview = newFOV;
```

Fig. 36

```
package events import flash.events.Event;
    public class NemaUpdateEvent extends Event public static const NEMA_UPDATE:String = "NEMA_UPDATE";
        private var _nemaStr:String;

public function get nema ():String
            return _nemaStr;
        public function NemaUpdateEvent (nemaString:String)
            super(NEMA_UPDATE);
            _nemaStr = nemaString;
```

Fig. 37

```
package events import flash.events.Event;
    public class TargetUpdateEvent extends Event public static const RANGE_UPDATE:String = "RANGE_UPDATE";
        private var _range:Number;

public function get range():Number
            return _range;
        public function TargetUpdateEvent(newRange:Number)
            super(RANGE_UPDATE);
            _range = newRange;
```

Fig. 38

```
fonts
  └──> MyClearviewHwy.as
```

Fig. 39

```
package fonts import flash.text.Font;
    public class MyClearviewHwy extends Font public function MyClearviewHwy()
        // defines the font and format of the font
```

Fig. 40

```
interface3
   └──> InterfaceContext.as
```

Fig. 41

```
package interface3 import controller.FLIRServiceStartupCommand;
    import controller.NemaParseCommand;
    import events.NemaUpdateEvent;
    import events.TargetUpdateEvent;
    import flash.display.DisplayObjectContainer;
    import model.Interface3Model;
    import org.robotlegs.base.ContextEvent;
    import org.robotlegs.mvcs.Context;
    import services.FLIRService;
    import views.FOVBar;
    import views.FOVBarMediator;
    import views.Gimble3D;
    import views.Gimble3DMediator;
    import views.Interface3Mediator;
    import views.SystemStateMediator;
    import views.SystemStateUI;
    import views.TargetDistanceMediator;
    import views.TargetDistanceView;
    import views.TargetUI;
    import views.TargetUIMediator;
    public class InterfaceContext extends Context public function
InterfaceContext(contextView:DisplayObjectContainer=null,
autoStartup:Boolean=true)
            super(contextView, autoStartup);
        override public function startup():void
            // start by mapping the classes that will be constrained
            // to Singletons. Map the mediators to the views -
            // Mediators provide the communication layer between
            // services/models/commands and the views
            // in this case, the UI components are being treated as
            // individual views of the application
```

Fig. 42

```
model
   └──> Interface3Model.as
```

Fig. 43

```
package model import org.robotlegs.mvcs.Actor;
    public class Interface3Model extends Actor ////////////////////////////////////////////////////////////////////
// Complete set of possible data objects that are passed from the FLIR
// az - camera azimuth
// el - camera elevation
// systemMode - the mode the FLIR is currently set to:
// RRATE - Remote Rate Mode
// RPOS - Remote Position Mode
// RHHOLD - Remote Heading Hold
// RAT - Remote AutoTrack Mode
// RSCAN - Remote Scan Mode
// PBIT - Power on BIT Mode
// RATE - Rate Mode (HCU is active)
// POS - Position Mode
// HHOLD - Heading Hold Mode
// AT - Autotrack Mode
// SCAN - Scan Mode
// MNULL - Manual Null Mode
// ANULL - Auto Null Mode
// IBIT - User Initiated Bit Mode
// NUC - NUC Mode
// STBY - Standby Mode
// bitStatus - checks for a bit error
// trackerMode - either TGT (target), or SCN (Scene Mode)
// videoSensor - I (IR), or C (CCD)
// sensorType - I (IR), or C (CCD)
// fov - Field Of View
// currentZoom - reads back on the 1.8x zoom or not (N = normal, or E =
extended)
// range - last range distance obtained from the laser range finder in
meters
////////////////////////////////////////////////////////////////////
            private var _az:Number;
            private var _el:Number;
            private var _systemMode:String;
            private var _bitStatus:String;
            private var _trackerMode:String;
            private var _videoSensor:String;
            private var _sensorType:String;
            private var _fov:Number;
            private var _currentZoom:Boolean;
            private var _range:Number;

public function Interface3Model()
                super();

//////////////////////////////////////////  GETTERS
            public function get az():Number
                return _az;
```

Fig. 44A

```
public function get el():Number
    return _el;
public function get systemMode():String
    return _systemMode;
public function get bitStatus():String
    return _bitStatus;
public function get trackerMode():String
    return _trackerMode;
public function get videoSensor():String
    return _videoSensor;
public function get sensorType():String
    return _sensorType;
public function get fov():Number
    return _fov;
public function currentZoom():Boolean
    return _currentZoom;
public function get range():Number
    return _range;

///////////////////////////////////  SETTERS
public function set az(num:Number):void
    _az = num;
public function set el(num:Number):void
    _el = num;
public function set systemMode(mode:String):void
    _systemMode = mode;
public function set bitStatus(status:String):void
    _bitStatus = status;
public function set trackerMode(mode:String):void
    _trackerMode = mode;
public function set videoSensor(kind:String):void
    _videoSensor = kind;
public function set sensorType(type:String):void
    _sensorType = type;
public function set fov(view:Number):void
    _fov = view;
public function set currentZoom(zoom:Boolean):void switch(zoom)
        case "N":
            _currentZoom = false;
            break;
        case "E":
            _currentZoom = true;
            break;
        default:
            _currentZoom = false;

public function set range(range:Number):void
    _range = range;
```

Fig. 44B

```
services
    ├──→ CameraService.as
    └──→ FLIRService.as
```

Fig. 45

```
package services import flash.media.Camera;
    import flash.media.Video;

import org.robotlegs.mvcs.Actor;
    import flash.display.Sprite;

public class CameraService extends Sprite private var _camera:Camera;
        private var _cameraWidth:Number = 640;
        private var _cameraHeight:Number = 480;
        private var _vid:Video;
        private var _bandwidth:int = 16384; // maximum bandwidth in
bytes per second -0 is variable bandwidth
        private var _quality:int = 50; // 0 to 100 - 0 is a variable
quality amount to maintain framerate
        private var _fps:int = 30;

public function CameraService()

_camera = Camera.getCamera();
            trace("Camera Name: " + _camera.name);
            //_camera.setQuality(_bandwidth, _quality);
            //_camera.setMode(_cameraWidth, _cameraHeight, _fps);

_vid = new Video(_cameraWidth, _cameraHeight);
            _vid.attachCamera(_camera);
            addChild(_vid);
```

Fig. 46

```
package services import events.NemaUpdateEvent;
    import flash.events.Event;
    import flash.events.IOErrorEvent;
    import flash.events.ProgressEvent;
    import flash.events.SecurityErrorEvent;
    import flash.net.Socket;
    import flash.utils.ByteArray;
    import org.robotlegs.mvcs.Actor;
    public class FLIRService extends Actor private var _flirSocket:Socket;
        private var _hostName:String = "192.168.42.203";
    private var _portNum:uint = 4002;
        private var _connectionOpen:Boolean = false;

// create the byte array that will store the socket data
        private var _flirByteAr:ByteArray;

private function FLIRService()
        private function startService():void
            // initializes the socket service, create the socket
            // listeners and connect to the socket
        private function OnSocketConnection(evt:Event):void
            // sets the system commands
        private function OnSocketResponse(evt:ProgressEvent):void
            // read and parse the byte array.
            // once the byte array is handed to be parsed, clear it
            // to avoid repeating bytes private function onSocketClose(evt:Event):void
            // close the connection, flush the socket, and
            // clear the byte array // setFlirESS establishes the frequency of system status updates
// all codes are NEMA strings followed by carriage return '\r' and new
line '\n\'
// must set ESS-Enable System Status with a rate of status updates
// must set ESD-Enable Sensor Data, sends the sensor states
// must set EPD-Enable SGA Position Data, send position status updates
//
/////////////////////////////////////////////////////////////////////
        private function setFlirSystemCommands():void
                // put the FLIR into remote mode
                // start with ESS and EPD then ESD private function cancelFlirSystemCommands():void protected function parseSocketData():void
            // takes the byteArray and checks it for valid nema
            // strings
```

Fig. 47

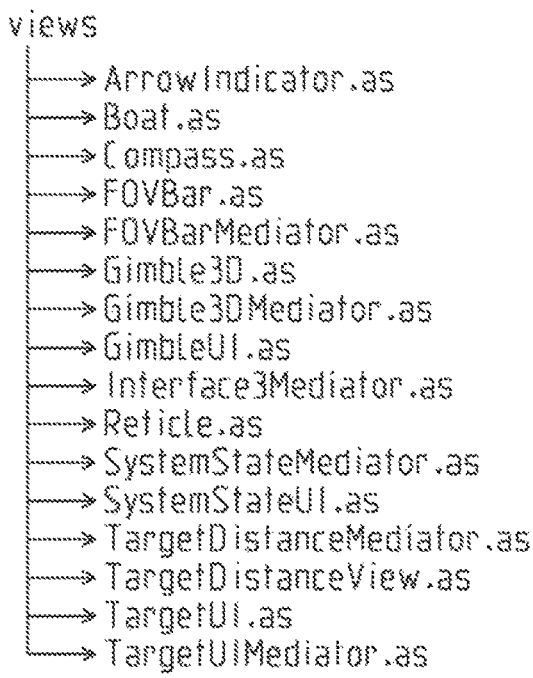

```
views
  |—→ ArrowIndicator.as
  |—→ Boat.as
  |—→ Compass.as
  |—→ FOVBar.as
  |—→ FOVBarMediator.as
  |—→ Gimble3D.as
  |—→ Gimble3DMediator.as
  |—→ GimbleUI.as
  |—→ Interface3Mediator.as
  |—→ Reticle.as
  |—→ SystemStateMediator.as
  |—→ SystemStateUI.as
  |—→ TargetDistanceMediator.as
  |—→ TargetDistanceView.as
  |—→ TargetUI.as
  |—→ TargetUIMediator.as
```

Fig. 48

```
package views import flash.display.Sprite;
    public class ArrowIndicator extends Sprite private var _arrow:Sprite;
        public function ArrowIndicator()
            // Draws the arrow
```

Fig. 49

```
package views import flash.display.Sprite;
    public class Boat extends Sprite public function Boat()
            // Draws the boat icon.
```

Fig. 50

```
package views import away3d.core.utils.Init;
    import com.greensock.TweenLite;
    import com.greensock.TweenMax;
    import com.greensock.easing.Strong;
    import com.greensock.events.*;
    import flash.display.MovieClip;
    import flash.display.Shape;
    import flash.display.Sprite;
    import flash.text.Font;
    import flash.text.TextField;
    import flash.text.TextFormat;

public class Compass extends Sprite

// create vars to hold the heading information
        private var _currentHeading:int = 0;
        private var _newHeading:int;
        private var _headingX:Number = -48;
        private var _headingY:Number = -25;
        private var _headingText:TextField;
        private var _headingInfo:String;

// create vars for the true north information
        private var _trueNorth:Sprite;
        private var _trueNorthX:int;
        private var _trueNorthY:int;
        private var _trueNorthText:TextField;
        private var _trueNorthArrowLeft:Sprite;
        private var _trueNorthArrowRight:Sprite;

// the separator bar from the heading to the true north
        private var _bar:Sprite;

// create a var for the format of all compass text
        private var _compassTextFormat:TextFormat;
        private var _northTextFormat:TextFormat;
        private var _compassFont:Font;

// add the var for the base Compass
        private var _compassBase:BaseCompass = new BaseCompass();
        private var _compassTween:TweenMax;

public function Compass()

addChild(_compassBase);
            createHeading();
            createTrueNorth();
            createBar();

protected function createHeading():void
            // creates the heading clip and sets the text format for
```

Fig. 51A

```
                // the heading information
                // instantiate the arrow and position
                // create the text field and set the format and text
                // position the textField
        private function createBar():void;

_bar = new Sprite();
                _bar.graphics.lineStyle(2, 0xFFFFFF, 1);
                _bar.graphics.moveTo(-15,-8);
                _bar.graphics.lineTo(15,-8);
                addChild(_bar);

protected function createTrueNorth():void
                //creates the True North Indicator
        protected function createCompassTextFormats():void
        public function updateCompass(heading:int):void // handling the dispatched event from the model through
                // the mediator
                // add a listener to alter the heading text based on the
                // animation private function onTweenUpdate(event:TweenEvent):void
                // Listener to alter heading text based on animation.
```

Fig. 51B

```
package views import flash.display.Sprite;
        public class FOVBar extends Sprite private var _fovBarContainer:Sprite;
                private var _fovBarColor:uint = 0xFCFF00;
                private var _fovMask:Sprite;
                public function FOVBar()
                        // initializes and draws the fov Bar.
                public function updateFOVMaskScale(newScale:Number):void // readjusts the scale of the FOV Mask and updates the
                        // FovBarContainer.
```

Fig. 52

```
package views import events.FOVEvent;

import org.robotlegs.mvcs.Mediator;

public class FOVBarMediator extends Mediator
        [Inject]
        public var fovView:FOVBar;

override public function onRegister():void
            eventMap.mapListener(eventDispatcher,
FOVEvent.FOV_UPDATE, onFOVUpdate, FOVEvent);

private function onFOVUpdate(evt:FOVEvent):void
            fovView.updateFOVMaskScale(evt.fieldofview);
```

Fig. 53

```
package views import events.AzUpdateEvent;
    import events.ElUpdateEvent;
    import org.robotlegs.mvcs.Mediator;
    public class Gimble3DMediator extends Mediator
        [Inject]
        public var gimble3DView:Gimble3D;
        override public function onRegister():void // register the mediator to listen for the Azimuth and
        // Elevation data coming from the socket service private function onAzUpdate(evt:AzUpdateEvent):void
            // updated az received, adjusting gimble view
        private function onElUpdate(evt:ElUpdateEvent):void
            // updated el received, adjusting gimble view
```

Fig. 55

```
package views
    import away3d.containers.*;
    import away3d.lights.DirectionalLight3D;
    import away3d.lights.PointLight3D;
    import away3d.materials.*;
    import away3d.primitives.*;
    import flash.display.Sprite;
    import flash.events.TimerEvent;
    import flash.geom.Vector3D;
    import flash.ui.Keyboard;
    import flash.utils.Timer;
    public class Gimble3D extends Sprite
    {
        protected var _view:View3D;
        protected var _cube1:Cube;
        protected var _cube2:Cube;
        protected var _torus:Torus;
        protected var _fovTorus:Torus;
        protected var _haloTorus:Torus;
        protected var _sphere:Sphere;
        protected var _dirArrow:Cone;
        protected var _maskCone:Cone;
        protected var _objectContainer:ObjectContainer3D;
        protected var _gimbleLightAbove:PointLight3D;
        protected var _gimbleLightBelow:PointLight3D;
        protected var _fovLight:DirectionalLight3D;
        protected var _az:Number = 0;
        protected var _el:Number = 0;
        private var _posX:int;
        private var _posY:int;
        public function Gimble3D(posX:int, posY:int)
            // sets X,Y, the view, the scene and camera.
        protected function _createView():void
            // create the view and add it to the stage
            // relocate the center point of the view to the center of
            // the stage
        protected function _createScene():void
            // setup the lights - above and below
            // then add the light for the fov
            // add the light to the scene
            // torus for the fov in the exact same place and size as
            // the other but with an orange cast
            // create the mask Cone for the FOV - this will be
            // controlled by the Zoom function of the FLIR camera
            // trying a torus to create the halo around the gimble
            // add the indicator arrow
            // assign the scene to the view
        protected function _createCamera():void
        public function updateAz(azimuth:Number):void
        public function updateEl(elevation:Number):void
```

Fig. 54

```
package views import flash.events.TimerEvent;
    import flash.globalization.DateTimeFormatter;
    import flash.text.Font;
    import flash.text.TextField;
    import flash.text.TextFormat;
    import flash.utils.Timer;

public class GimbleUI extends BaseGimble private var _craftTime:String;
        private var _craftDateTimeFormat:String;
        private var _craftDate:String;
        private var _craftTimeTimer:Timer;
        private var _craftTimeText:TextField;
        private var _craftDateText:TextField;
        // GimbleUI has 3 sets of text data for the craft
        // information: time/date, lat, and long
        private var _craftInfo:TextField;
        private var _craftInfoTextFormat:TextFormat;
        private var _craftInfoFont:Font;
        private var _craftLat:String;
        private var _craftLong:String;

public function GimbleUI()

// Initializes the time format and the timer.

protected function createCraftInfo():void

// Builds the text box for the following craft info.

protected function createCraftInfoFormat():void

// aligns and sets the font, color and size of the
            // following craft info.

public function setCraftTime(event:TimerEvent):String

// sets the date and time based on the selected format
            // for the following craft.

public function setCraftDateTimeFormat(format:String):String

// set the format for date and time for the following
            // craft.
```

Fig. 56

```
package views import events.TargetUpdateEvent;
    import org.robotlegs.mvcs.Mediator;
    public class Interface3Mediator extends Mediator

[Inject]
        public var interface3View:Interface3Rebuild;
        public override function onRegister():void eventMap.mapListener(eventDispatcher,
TargetUpdateEvent.RANGE_UPDATE, onRangeUpdate, TargetUpdateEvent);

private function onRangeUpdate(evt:TargetUpdateEvent):void
            interface3View.onTargetUpdate();
```

Fig. 57

```
package views import flash.display.Sprite;

public class Reticle extends ReticleBase public function Reticle()

// draws the reticle
```

Fig. 58

```
package views import events.CameraUpdateEvent;
    import org.robotlegs.mvcs.Mediator;

public class SystemStateMediator extends Mediator

[Inject]
        public var systemStateView:SystemStateUI;
        override public function onRegister():void eventMap.mapListener(eventDispatcher,
CameraUpdateEvent.UPDATE_CAMERA, onUpdateCamera, CameraUpdateEvent);

private function onUpdateCamera(evt:CameraUpdateEvent):void
            systemStateView.updateCameraType(evt.cameraType);
```

Fig. 59

```
package views import flash.display.Sprite;
    public class SystemStateUI extends Sprite
        private var _uiSpacer:int = 10;
        private var _contrastAutoIcon:ContrastAutoIcon;
        private var _contrastManIcon:ContrastManIcon;
        private var _contrastHistIcon:ContrastHistIcon;
        private var _brightAutoIcon:BrightnessAutoIcon;
        private var _brightManIcon:BrightnessManualIcon;
        private var _cameraCCDIcon:CameraCCDIcon;
        private var _cameraIRIcon:CameraIRIcon;
        private var _cameraLLTVIcon:CameraLLTVIcon;
        private var _cameraBHIcon:CameraBHIcon;
        private var _cameraWHIcon:CameraWHIcon;
        private var _focusAutoIcon:FocusAutoIcon;
        private var _focusManIcon:FocusManIcon;
        private var _gpsIcon:GPSIcon;
        private var _zoomIcon:Sprite;

// start and end positions for the UI Icons
        private var _contrastIconStartX:int = -.1;
        private var _contrastIconStartY:int = 1.5;
        private var _contrastIconEndX:int;
        private var _contrastIconEndY:int;
        private var _brightIconStartX:int = 58.95;
        private var _brightIconStartY:int = 3.8;
        private var _brightIconEndX:int;
        private var _brightIconEndY:int;
        private var _cameraIconStartX:int = 96.7;
        private var _cameraIconStartY:int = 32.5;
        private var _cameraIconEndX:int;
        private var _cameraIconEndY:int;
        private var _focusIconStartX:int = 110;
        private var _focusIconStartY:int = 64.8;
        private var _focusIconEndX:int;
        private var _focusIconEndY:int;

public function SystemStateUI ()
            initDefaultUI ();

private function initDefaultUI ():void
            // Initializes all of the icons for the camera status.

public function updateCameraType(type: String):void
            // updates the Icon for the Camera type.
```

Fig. 60

```
package views import events.FeedbackMessage;
    import events.TargetUpdateEvent;
    import org.robotlegs.mvcs.Mediator;
    public class TargetDistanceMediator extends Mediator

[Inject]
        public var targetDistView:TargetDistanceView;
        override public function onRegister():void eventMap.mapListener(eventDispatcher,
TargetUpdateEvent.RANGE_UPDATE, onTargetUpdate, TargetUpdateEvent);

private function onTargetUpdate(evt:TargetUpdateEvent):void
            targetDistView.updateRange(evt.range);
```

Fig. 61

```
package views import flash.display.Sprite;
    import flash.text.TextField;
    import flash.text.TextFormat;
    import com.greensock.TweenLite;
    import com.greensock.easing.*;
    public class TargetDistanceView extends Sprite private var _targetDistance:Number;
        private var _targetDistLargeFormat:TextFormat;
        private var _targetDistHolder:Sprite;
        private var _targetDistTf:TextField;
        public function TargetDistanceView()

createTextFormat();
            createTargetDistanceHolder();

private function createTextFormat():void
            // sets the format of the target text box.
        private function createTargetDistanceHolder():void // draws the target text box and the target range box
            // next to the reticle.

public function updateRange(range:Number):void

// set the target text on the UI and on the large range
            // box in the center of the screen
```

Fig. 62

```
package views import flash.display.Sprite;
    import flash.events.Event;
    import flash.events.TimerEvent;
    import flash.globalization.DateTimeFormatter;
    import flash.text.TextField;
    import flash.text.TextFormat;
    import flash.utils.Timer;
    public class TargetUI extends BaseTarget // set up variables to hold target distance, lat long and bearing
        private var _targetDistance:Number;
        private var _targetLat:String = "38° 52' 8.042\" ";
        private var _targetLong:String = "86° 49' 32.082\" ";
        private var _targetBearing:String = "246°";
        // create vars for text fields - 1 for target dist, target
info (lat long bearing) and timer
        private var _targetDistTextField:TextField;
        private var _targetInfoTextField:TextField;
        private var _targetTimerTextField:TextField;
        // setup the target timer
        private var _targetTimer:Timer;
        // set up the sprite to hold the target distance near reticle
        private var _targetDistHolder:Sprite;
        private var _targetDistTf:TextField;
        private var _targetDistHolderX:int;
        private var _targetDistHolderY:int;
        // set up var for format of text
        private var _targetDistTextFormat:TextFormat;
        private var _targetInfoTextFormat:TextFormat;
        private var _targetDistLargeFormat:TextFormat;
        private var _targetTimerFormat:TextFormat;
        // set up a var to hold boolean for the large target distance
- initially set to false
        private var _targetDistanceShowing:Boolean = false;
        private var _targetTimeCount:Number = 0;
        private var _pastTime:uint;
        private var _targetTimerFormat:DataTimeFormatter;
        private var _targetStartTime:Date;

public function TargetUI()

createTargetText();
            createTargetDistanceHolder();
            setupTimers();

protected function createTargetText():void
            // creates the text in the target text box.
        protected function createTargetDistanceHolder():void
            // create the range to target next to the reticle.
        private function createTextFormats():void
            // set the format for the text.
        public function setupTimers():void
```

Fig. 63A

```
public function resetTimers():void
    // reset target timers
private function onTargetTimer(evt:TimerEvent):void
    // Calculates the on target time.
public function updateRange(range:Number):void // set the target text on the UI and on the large range
box in the center of the screen
```

Fig. 63B

```
package views import events.FeedbackMessage;
    import events.TargetUpdateEvent;

import org.robotlegs.mvcs.Mediator;

public class TargetUIMediator extends Mediator

[Inject]
        public var targetUIView:TargetUI;

override public function onRegister():void eventMap.mapListener(eventDispatcher,
TargetUpdateEvent.RANGE_UPDATE, onTargetUpdate, TargetUpdateEvent);

private function onTargetUpdate(evt:TargetUpdateEvent):void
            targetUIView.updateRange(evt.range);
```

Fig. 64

```
package import com.greensock.*;
    import com.greensock.easing.*;

import flash.desktop.NativeApplication;
    import flash.display.MovieClip;
    import flash.display.NativeWindow;
    import flash.display.NativeWindowInitOptions;
    import flash.display.Sprite;
    import flash.display.Stage;
    import flash.display.StageAlign;
    import flash.display.StageDisplayState;
    import flash.display.StageScaleMode;
    import flash.display.KeyboardEvent;
    import flash.media.Camera;
    import flash.media.Video;

import interface3.InterfaceContext;

import services.CameraService;

import views.Compass;
    import views.FOVBar;
    import views.Gimble3D;
    import views.GimbleUI;
    import views.Reticle;
    import views.SystemStateUI;
    import views.TargetDistanceView;
    import views.TargetUI;

public class Interface3Rebuild extends Sprite

// establish the RL context
        protected var _interfaceContext:InterfaceContext;

///////////////////////////////////////////////// UI Elements
        // create the different types of view UI components
            // gimbleUI - gimble UI background element
            // gimble - the actual 3D gimble drawn using Away3D
            // compass - the round compass on bottom right
            // reticle - the normal white version of the reticle
            // reticleLock - the red-ringed reticle
            // targetUI - background UI elements for target data

/////////////////////////////////////////////////////////// private var _gimbleUI:GimbleUI;
        private var _gimble:Gimble3D;
        private var _compass:Compass;
        private var _reticle:Reticle;
        private var _reticleLock:ReticleLock;
        private var _targetUI:TargetUI;
```

Fig. 65A

```
        private var _fovBar:FOVBar;
        private var _targetDistance:TargetDistanceView;

// variables to place the UI elements to animate in
        private var _compassStartX:Number;
        private var _gimbleBaseStartX:Number;
        private var _compassEndX:Number;
        private var _gimbleBaseEndX:Number;

private var _video:CameraService;

private var _camera:Camera;
        private var _cameraWidth:Number;
        private var _cameraHeight:Number;
        private var _vid:Video;
        private var _bandwidth:int = 16384; // maximum bandwidth in
bytes per second - 0 is variable bandwidth
        private var _quality:int = 50; // 0 to 100 - 0 is a variable
quality amount to maintain framerate
        private var _fps:int = 30;

private var _appScale:int;

public function Interface3Rebuild ()

_interfaceContext = new InterfaceContext (this);
                init ();
                initVideo ();
                buildUI ();

private function init () :void

// setup the native application window settings

// FB is opening 2 windows on startup - so I close the first
default window

// instantiate the native window and set the size

// activate the native window and add it to the display list

// set the stage modes and settings

// app scale is built in to allow for the UI objects to be
scaled in 4:3 proportion for larger screen sizes private function buildUI () :void // add the gimble3D elements - takes a width and height as
position elements
        // attempts to position it just right of the side of the left
edge and just above the baseline
```

Fig. 65B

```
            // gimble UI element - this should be placed to cut off some
of the edges
            // position the gimble base // compass - positioned on the bottom right side of the screen // target UI - this is initially hidden, since it is triggered
when target lock is acquired // reticle - centered on the stage
            // reticle and reticle lock are not actually controlled by
anything
            // these represent the track area and track lock of the FLIR,
but that information is not passed through from the CCFLIR // target distance holder - large format range indicator // add the UI elements to the display list // set the tweens and start them private function initVideo () :void
            // initialize the camera public function onTargetUpdate () :void
            if(_TargetUI.visible)
                _TargetUI.visible = true;
```

Fig. 65C

COGNITIVE LOAD REDUCTION AND FIELD OF VIEW ENHANCING STANDARDIZED GRAPHICAL USER INTERFACE (GUI) OVERLAY GENERATING SYSTEM OR SYSTEMS THAT INCLUDE ELEMENTS THAT CORRELATE VARIOUS DEVICE, EVENT, OR OPERATION INPUTS WITH COMMON GUI OVERLAY GENERATION MODULES AND GROUP RELATED GUI ELEMENTS ACROSS OVERLAYS ALONG WITH ASSOCIATED METHODS

CROSS-REFERENCE TO RELATED APPLICATIONS

The present application claims priority to U.S. Provisional Patent Application Ser. No. 61/637,499, filed Apr. 24, 2012, entitled "INTUITIVE INTERFACE INITIATIVE," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used, and licensed by or for the United States Government for any governmental purpose without payment of any royalties thereon.

FIELD OF THE INVENTION

The field of the invention is related to interface systems. In particular, embodiments of the invention are related to standard graphical user interface (GUI) that is compatible with a variety of sensor and information systems such as, for example, Electro Optical and Sensory Equipment designed around the needs of the ends user.

BACKGROUND OF THE INVENTION

There is a need for a GUI video overlay to provide users the ability to use original equipment manufacturers (OEM) generated GUIs. OEM purchasers utilize a vast and varying inventory of electro-optic (EO) devices for every service and mission. It has proven most cost effective to utilize contractor equipment to fulfill the requirement of the sponsors and operators. Each OEM develops unique methods and implementations of displaying necessary system information to the user. Sponsors, users, or government representatives rarely dictate the design, format or characteristics of required display information. Usually only specific data required by the operator to effectively complete their mission is captured in requirements, but not the placement and characteristics of this information.

Operational effectiveness is affected in many ways including: too much or too little on-screen information; varying needs of the operators based on roles or missions (ex: gunner versus officer in charge); over-engineered overlays causing option overload; design without operator input; text readability and un-intuitive symbology; and minimal or no capability to configure the display for varying mission requirements.

Existing EO device video interfaces cause multiple training issues. When new EO systems are introduced, there is a learning curve in order to be proficient in the operation of the system due to the GUI. When operators are required to operate multiple, unique EO devices, each has distinct placement and characteristics that, at times, cause confusion. Training curriculum is required to be developed for each unique system. Changes to the display interface require additional funds in order for the OEM to implement required changes.

During operation within a system of systems environment, multiple hardware displays can be required to be co-located in order to provide the operator with necessary information to complete their objectives. This increases the cost and decreases the effectiveness of information processing required of the operator.

SUMMARY OF THE INVENTION

The present invention is a system for standardizing data received for display purposes. The device comprises device drivers that are configured to receive data and video from a plurality of sensory devices that the device drivers are configured for. The data is then used to create standardized GUI overlays. The GUI overlays show the data using both symbology and text. The GUI overlays are then combined with the video and displayed in such a way that the data is shown in the same way, independent of the source of the device sensory.

Embodiments of the invention were developed to provide features such as a standardized GUI that is compatible with existing EO and sensory equipment designed around the needs of the end user.

In certain aspects, the present invention provides a novel device that can effectively display data from a variety of devices in a manner that is standardized and intuitive to use. Accordingly, in one embodiment, the present invention provides a device that includes one or more electro-optical devices, a processor, a plurality of storage media, a display, a software program, a library of device drivers and a video data grabber. The software program is executed by the processor and stored on the storage media. The software program is configured to detect each electro-optical device connected, select a device driver from the library of device drivers which are stored on the storage media, and use that device driver to translate data from the attached electro-optical device. The software program then uses the data that it translated to create a standardized overlay. The overlay is designed to communicate critical information quickly and be intuitive to use. The video data grabber receives video from each electro-optical device and then the software combines the video with the overlay to be shown on the display.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 24 shows the contents of the primitives directory in the away3d directory;

FIG. 27 shows the contents of the tools directory in the away3d directory;

FIG. 28 shows the contents of the controller directory;

FIG. 29 shows a representation of the contents of FLIRServiceStartupCommand;

FIG. 30 shows a representation of the contents of NemaParseCommand;

FIG. 31 shows the contents of the events directory;

FIG. 32 shows a representation of the contents of AzUpdateEvent;

FIG. 33 shows a representation of the contents of CameraUpdateEvent;

FIG. 34 shows a representation of the contents of ElUpdateEvent;

FIG. 35 shows a representation of the contents of FeedbackMessage;

FIG. 36 shows a representation of the contents of FOVEvent;

FIG. 37 shows a representation of the contents of NemaUpdateEvent;

FIG. 38 shows a representation of the contents of TargetUpdateEvent;

FIG. 39 shows the contents of the fonts directory;

FIG. 40 shows a representation of the contents of MyClearviewHwy;

FIG. 41 shows the contents of the Interface3 directory;

FIG. 42 shows a representation of the contents of InterfaceContext;

FIG. 43 shows the contents of the model directory;

FIGS. 44A and 44B show a representation of the contents of Interface3Model;

FIG. 45 shows the contents of the services directory;

FIG. 46 shows a representation of the contents of CameraService;

FIG. 47 shows a representation of the contents of FLIRService;

FIG. 48 shows the contents of the views directory;

FIG. 49 shows a representation of the contents of ArrowIndicator;

FIG. 50 shows a representation of the contents of Boat;

FIGS. 51A and 51B show a representation of the contents of Compass;

FIG. 52 shows a representation of the contents of FOVBar;

FIG. 53 shows a representation of the contents of FOVBarMediator;

FIG. 54 shows a representation of the contents of Gimble3D;

FIG. 55 shows a representation of the contents of Gimble3DMediator;

FIG. 56 shows a representation of the contents of GimbleUI;

FIG. 57 shows a representation of the contents of Interface3Mediator;

FIG. 58 shows a representation of the contents of Reticle;

FIG. 59 shows a representation of the contents of SystemStateMediator;

FIG. 60 shows a representation of the contents of SystemStateUI;

FIG. 61 shows a representation of the contents of TargetDistanceMediator;

FIG. 62 shows a representation of the contents of TargetDistanceView;

FIGS. 63A and 63B show a representation of the contents of TargetUI;

FIG. 64 shows a representation of the contents of TargetUIMediator; and

FIGS. 65A, 65B and 65C show a representation of the contents of Interface3Rebuild.

DETAILED DESCRIPTION OF THE INVENTION

Figure 1:
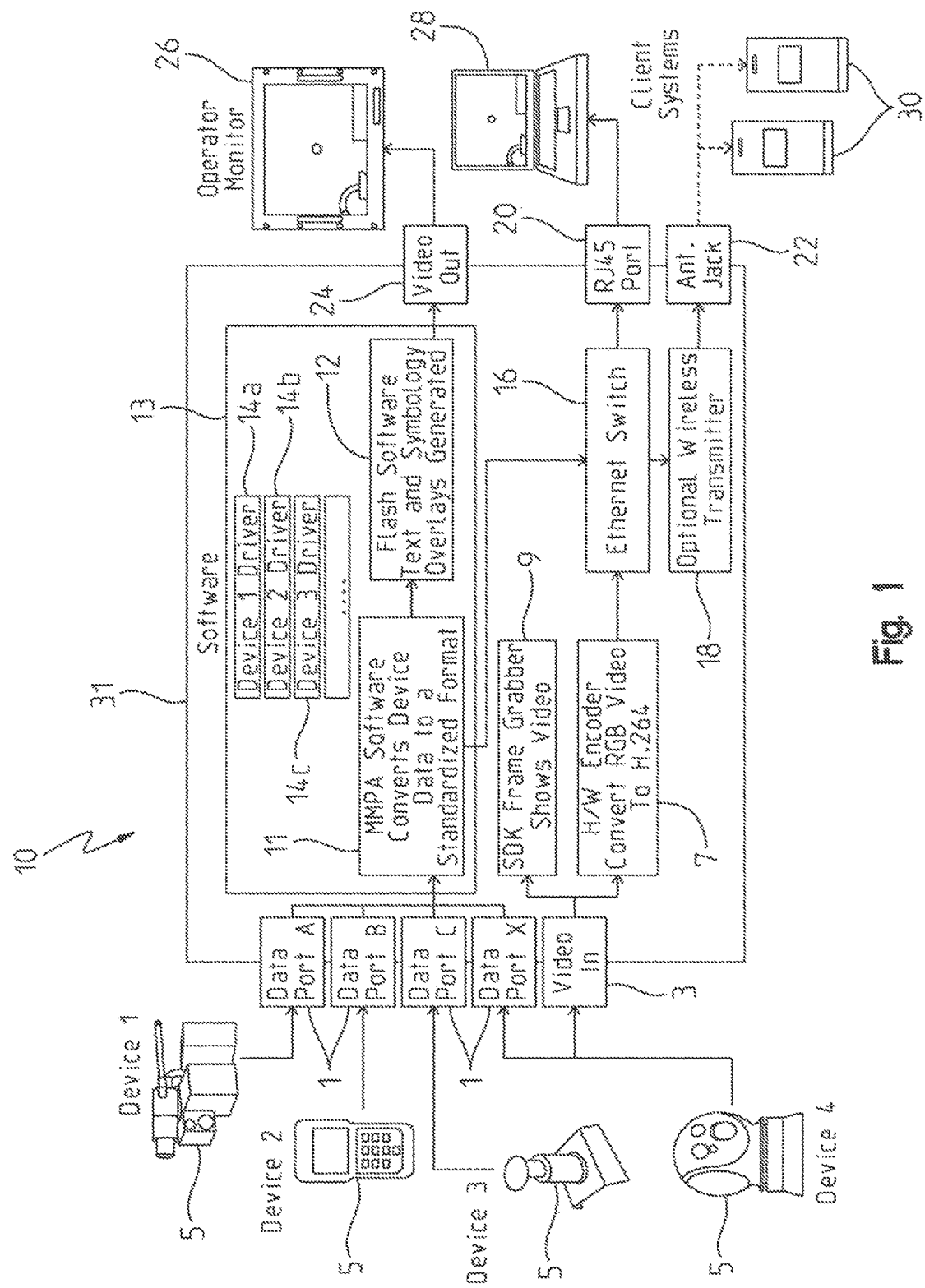
FIG. 1 shows an overview of hardware and software architecture in accordance with of one embodiment of the invention that allows that data and video from a variety of devices to be collated and sent display units.

The embodiments of the invention described herein are not intended to be exhaustive or to limit the invention to precise forms disclosed. Rather, the embodiments selected for description have been chosen to enable one skilled in the art to practice the invention.

One exemplary system accepts video and data from a wide array of systems utilizing multiple formats. This video and data is then displayed via the GUI. Data transmission formats and characteristics can vary among multiple OEM vendors. The invention may operate with commercially standard formats that can comprise, for example, 90% of the EO devices. Embodiments of the invention can include a system where power required to operate an exemplary Intuitive Interface Initiative (3I) system would need to be developed around military standards and also would need to operate independently of craft/vehicle power sources. Exemplary GUI embodiments in accordance with an embodiment of the invention are intuitive and easy to interpret. Exemplary embodiments display information unobtrusively to allow effective operation of the EO sensor.

Hardware architecture required to accomplish 3I objectives is flexible and adaptive to cover the broad spectrum of existing systems. Embodiments of the 3I system also may be upgraded to evolve as technology continues to increase performance of the system.

One embodiment of the invention uses an object oriented architecture written in Actionscript 3.0 language (AS3). The exemplary framework was written to be modular which allows the code to be updated to add additional devices by writing a "translator" class. This class converts the device's raw data into a format that the software's "parser" class could use and distribute to the device specific objects displayed in the user's GUI. The device would then be added to the framework's library of compatible devices that the software recognizes along with any device specific GUI assets (target reticles, icons, etc.).

Many advantages are realized from implementation of an example of a 3I system including an increase in effectiveness. Data displays can be designed and tailored to meet different user's needs. Consistency of overlays can be realized for a wide variety of systems and sensors. Response times to interpret and act on data can be reduced. Training costs and curriculum can be standardized and on the job training reduced resulting in minimal cost for changes to an exemplary overlay as opposed to utilizing OEM contractors to implement. As new systems are fielded to replace obsolete or ineffective systems, minimal impacts will be realized by the operators related to an exemplary video overlay. As video is ported off the EO system to be displayed by other users, multiple devices can be used. Screen over clutter can be tailored and reduced to meet the needs of the operator. Multiple sensors can feed data to a common display reducing operator workload and duplicative display costs. Customization can be realized by operators to efficiently get the information needed to complete objectives and thus reducing errors or misinterpretation of the data.

An embodiment of a 3I system provides capabilities including an ability to make both the video and serial data from a common off-the-shelf (COTS) camera available to a single application. In this example, combinations of hardware for conversion and type of code chosen (e.g., AS3) allows for the capabilities for 3I's utilization in many types of operating systems and devices.

An embodiment of 3I can be modified and used for any system that receives data and displays to an operator. The system could adapt to provide individual overlays for sensors on radars, lethal effectors, less than lethal effectors, global positioning systems, other visual augmentation systems, and any other military hardware that provides a video source or interface with information displayed on the screen.

Referring to FIG. 1, an exemplary overview of the hardware and some aspects of software architecture of the Translator Device 10 is shown. An assembly 31 is shown with a variety of inputs, outputs, and internal components. Translator Device 10 has Data Ports 1, which allow Translator Device 10 to receive data feeds from Sensor Devices 5. Data received through the Data Ports 1 is then sent to the Software 13. Within the Software, interface software, such as for example, Modular Mission Payload Architecture (MMPA) Software 11, provides an interface between a sensor, e.g., Sensor Device 5, and other software systems such as Operator Monitor 26 or Client Systems 28. In this example, MMPA Software 11 detects which Sensor Device 5 attached to Data Port 1. MMPA Software 11 then selects the appropriate Device Driver 14a-14c to use with the Sensor Device 5. Then the selected Device Driver 14a-14c is used to convert the data from the Sensor Device 5 into a standardized format. The data is then sent to Flash Software 12. Flash Software 12 uses that data to create text and symbology overlays.

The Translator Device 10 also has Video-in Ports 3 which allows the Translator Device 10 to read video data from Sensor Devices 5. This video information is then sent to a Software Development Kit (SDK) Frame Grabber 9 and a Hardware Encoder 7. SDK Frame Grabber 9 combines the video with the text and symbology overlay from the Flash Software 12 and sends the combined data and video to Video Out Port 24. Video Out Port 24 is connected to one or more Operator Monitor 26 to display the combined information.

In this example, Hardware Encoder 7 converts the red, green, blue (RGB) video to H.264. The H.264 data is then combined with the text and symbology overlay from the flash software 12 and sent to Ethernet Switch 16. This allows the information to be sent out through a RJ45 Port 20 to Client Systems 28. Alternatively, information may be sent out via a Wireless Transmitter 18 which is connected to an Antenna Jack 22 to transmit the information to be picked up by Mobile Client Systems 30.

Figure 2:
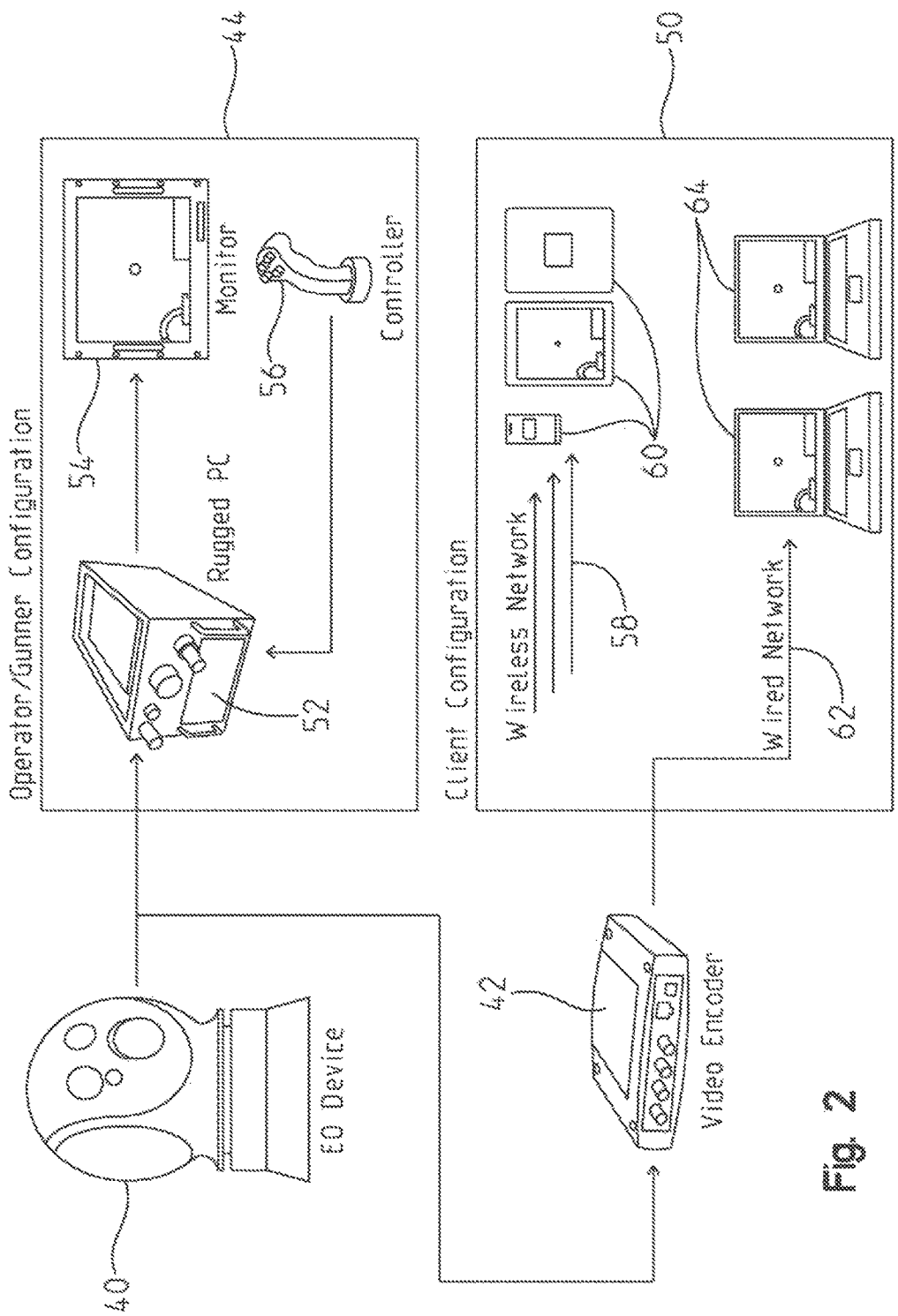
FIG. 2 shows another embodiment of the system including an operator system, a client system, a sensor system, and a video encoder system.

FIG. 2 details an exemplary 3I architecture with one sensor type, e.g., forward looking infrared (FLIR) laser camera software classes. Referring to FIG. 2, an exemplary EO Device 40 is connected to an Operator/Gunner Configuration system 44. EO Device 40 sends data and video to a Ruggedized Mobile Computing Device, e.g., a Personal Computer (PC) 52, which transmits data to Monitor 54 for display. Rugged PC 52 also receives information from a Controller 56 which allows a user to control where EO Device 40 is aimed. Video from the EO device 40 is also sent to a Video Controller 42 which sends video data to a Client Configuration System 50. This exemplary Client Configuration System 50 allows data to be sent through Wireless Network 58 to be displayed on Mobile Devices 60. Client Configuration System 50 also allows data to be sent via Wired Network 62 for display on Computers 64.

Figure 3:
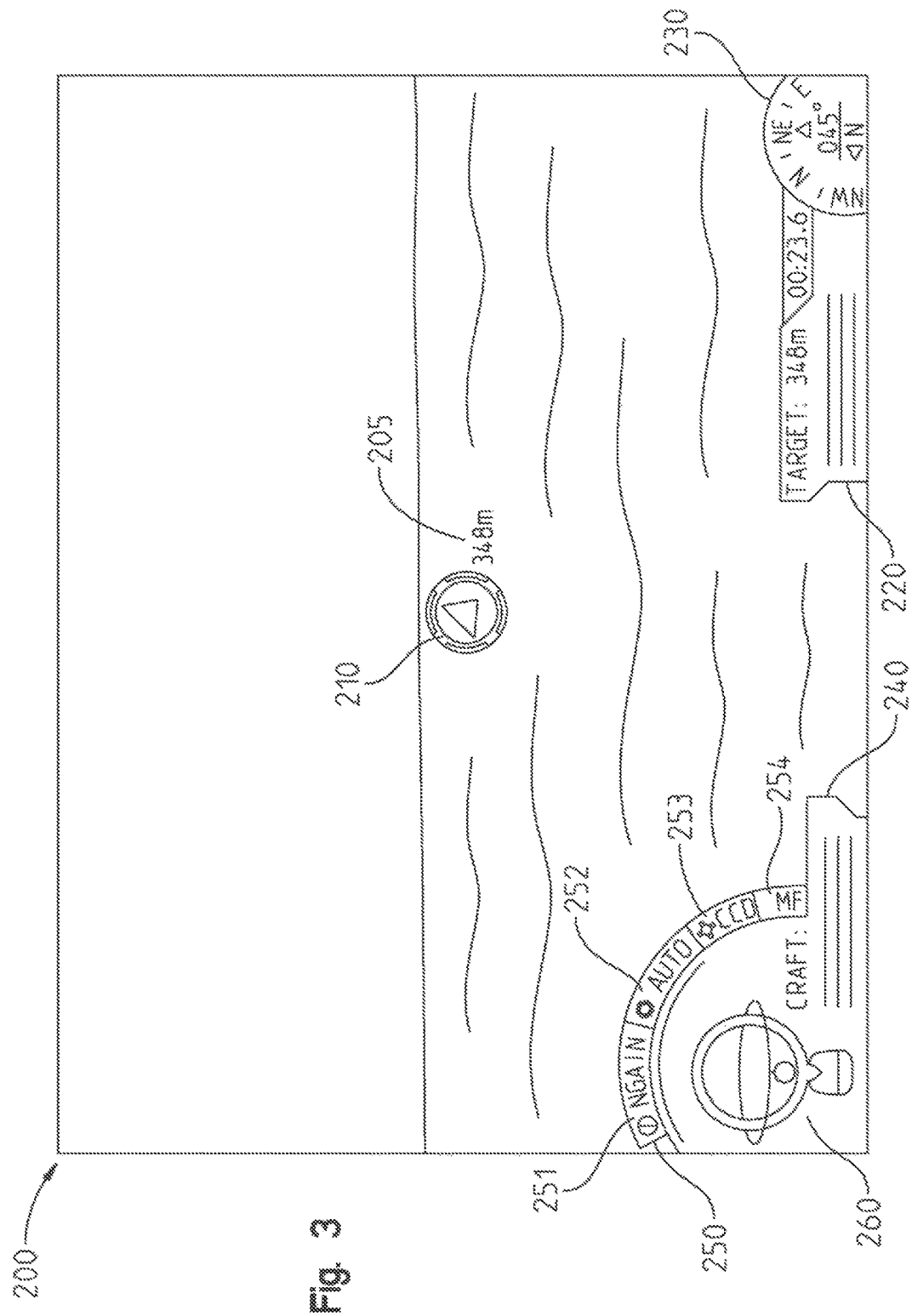
FIG. 3 shows a GUI display in accordance with another embodiment of the invention.
Figure 4:
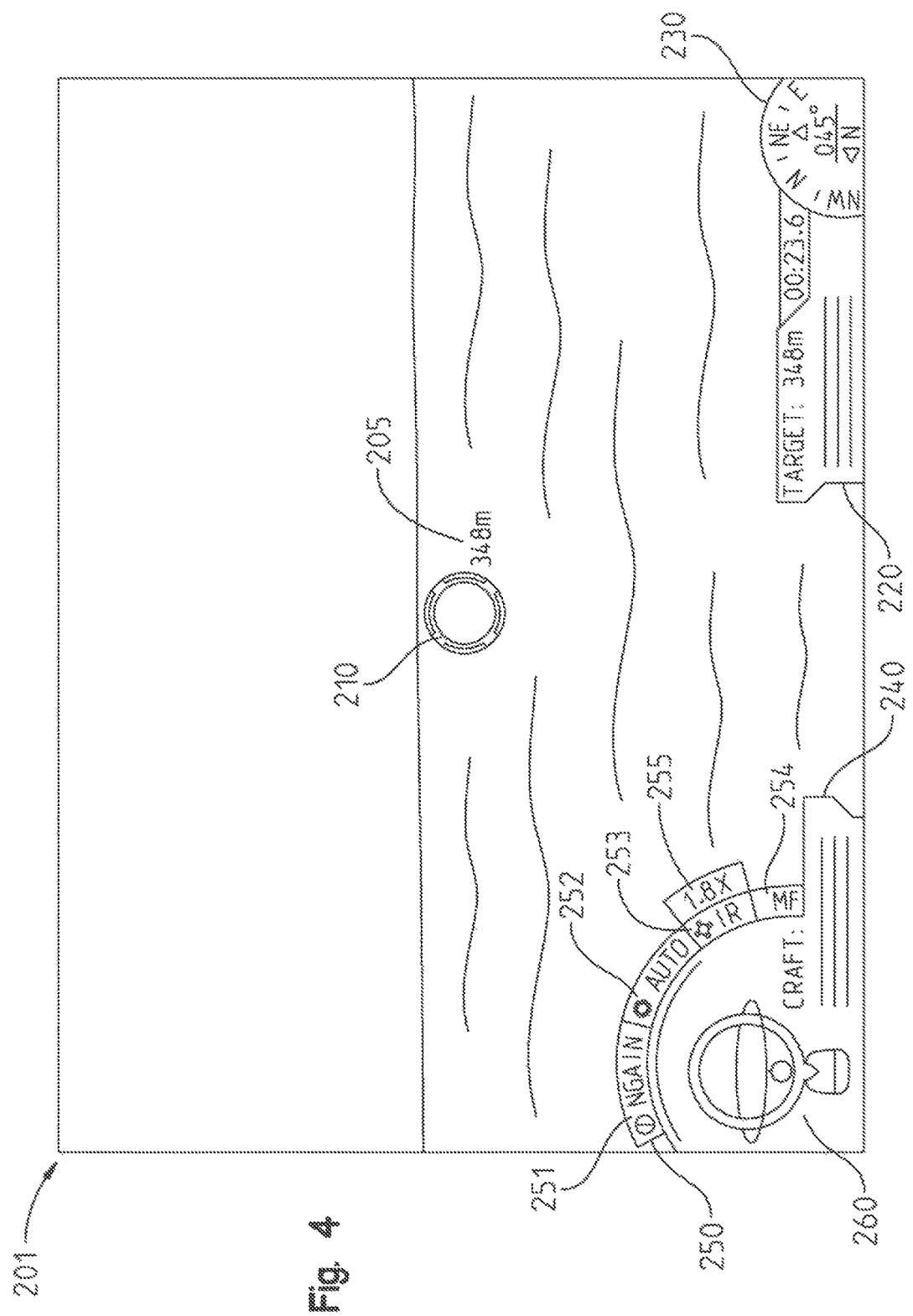
FIG. 4 shows a GUI display in accordance with another embodiment of the invention where the camera view shows the camera in an Infrared (IR) Mode.

FIGS. 3 and 4 show different potential embodiments of a standardized GUI. In these example embodiments, the combined video information and symbology overlays are displayed in the User View 200. In User View 200, a Targeting Reticle 210 is provided which is located over a video image of a Target 205. Targeting Reticle 210 also displays the range to Target 205. An exemplary GUI also contains a Target Text Box 220 which displays Target's current position in latitude and longitude, and bearing and distance from the Sensory Device 5.

Following Craft Text Box 240 displays information about a device associated with the GUI, e.g., EO Device 40, including location in latitude and longitude and date and time the video is captured. An Orientation Element 260 displays a graphical representation of a gyroscopic orientation of a device associated with an exemplary GUI, e.g., direction of a field of view of a sensor associated with an EO Device 40. Compass 230 further displays the direction of orientation of the EO Device 40. Camera Status Icons 250 allows a user to quickly view the state of the EO Device 40.

Camera Status Icons 250 update with regards to the EO Device 40 attached, only displaying those Icons that are available for use with an attached EO Device 40. The Camera Status Icons 250 can include Contrast 251, Brightness 252, Camera Mode 253, and Focus 254.

FIG. 4 shows User View 201 for when a FLIR camera attached and is engaged in Infrared Mode. In this mode, the video feed from the camera is changed. This change in mode is shown by Camera Mode Icon 253 which in FIG. 4 is shown as IR. Also a Magnification Icon 255 may also be used. Unlike the other Camera Status Icons 251-254, some Icons like Magnification 255 and GPS (not shown) are only visible when those modes are activated or the devices attached support them.

Figure 5:
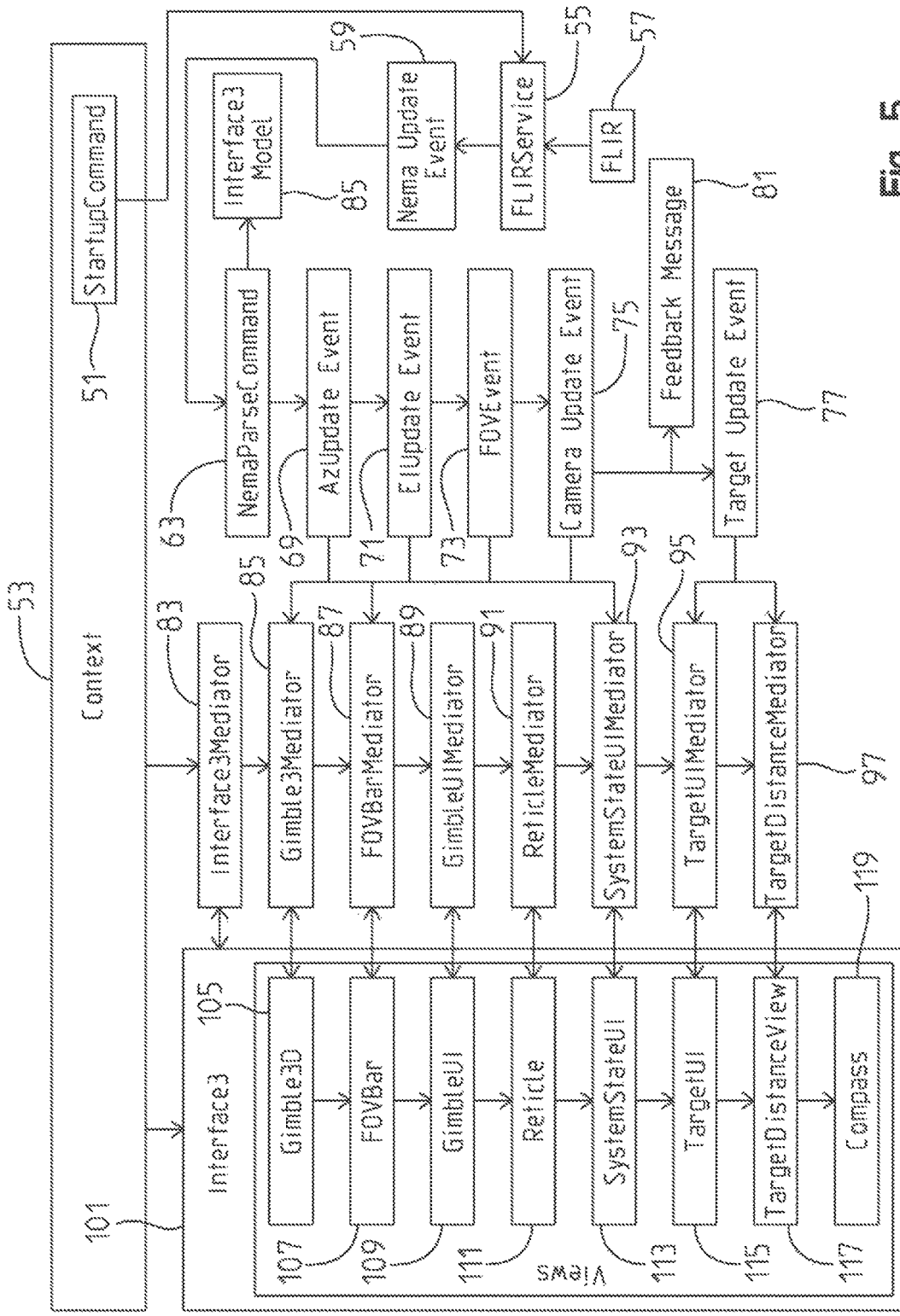
FIG. 5 shows a model of a software architecture framework that translates data into a common and configurable feed in accordance with one embodiment of the invention.

FIG. 5 shows an exemplary programming interface in accordance with one embodiment of the invention. In particular, FIG. 5 shows exemplary software code organized by classes along with high level communication flow for segments of software code within the Context 53. In this embodiment the application utilizes the Robotlegs coding architecture and 3rd party plugins/engines. Robotlegs is an Action Script 3 architecture/framework that utilizes automated metadata based dependency injection. The event driven Robotlegs framework made the 3I code modular enough to enable the addition of future functionality with new sensors.

Context 53 initializes the dependency injection between Mediators (e.g. 83-97) and Views (e.g. 101-119). StartupCommand 51 activates FLIRService 55 and NemaParseCommand 63. FLIRService 55 defines the data socket settings including an internet protocol (IP) address and an assigned computer interface port address, connects to a socket service provided by an operating system on a computer e.g., the PC 52 or client system 28, and configures the FLIR communication to be transmitted. When a message comes in from FLIR 57, FLIRService 55 stores the data from a socket in buffer, and parses the socket data. Then NemaUpdateEvent 59 gets socket data as a NMEA string which is based on the NMEA 0183 standard. NemaUpdateEvent 59 sends that string to NemaParseCommand 63 which parses the NMEA string and dispatches events with the parsed data to update the values associated with the parsed values. NemaParseCommand 63 also activates Interface3Model 85, which gets and sets azimuth, elevation, system mode, bit status, tracker mode, video sensor, sensor type, field of view, current zoom, and range.

Events associated with NemaParseCommand 63 include AzUpdateEvent 69 (updates azimuth value), ElUpdateEvent 71 (updates elevation value), FOVEvent 73 (updates field of view value), CameraUpdateEvent 75 (updates camera type), TargetUpdateEvent (updates range value) 77, and FeedbackMessage (returns a message string) 81.

FOVBarMediator 87 waits for an update from FOVEvent 73 to update the scale of field-of-view mask in FOVBar 107. FOVBar 107 then defines, generates and animates the field-of-view components to be displayed.

Gimble3DMediator 85 waits for an update from AzUpdateEvent 69 to update the azimuth in Gimble3D 105. Gimble3DMediator 85 also waits for an update from ElUpdateEvent 71 to update the elevation in Gimble3D 105. Gimble3D 105 defines, generates, and animates the camera graphics to be displayed.

Interface3Mediator 83 waits for an update from TargetUpdateEvent 77 to update the target range objects. Interface3Mediator 83 also interacts with Interface3 101 to create GUI objects shown in FIGS. 3 & 4.

SystemStateMediator 93 waits for an update from CameraUpdateEvent 75 to update a camera type in SystemStateUI 113. SystemStateUI 113 defines and generates Camera Status Icons 250.

TargetDistanceMediator 97 waits for an update from TargetUpdateEvent 77 to update target reticle range on screen values in TargetDistanceView 117. TargetDistanceView 117 then defines and generates target reticle range data as seen in close proximity to Targeting Reticle 210.

TargetUIMediator 95 waits for an update from TargetUpdateEvent 77 to update the range to the target history data in TargetUI 115. TargetUI 115 then defines and generates target history data on the lower right side of the screen in Target Text Box 220.

GimbleUIMediator 89 interacts with the GimbleUI 109 to define and generate the following craft UI of time, latitude, and longitude as seen in the Following Craft Text Box 240.

ReticleMediator 91 interacts with Reticle 111 to display Targeting Reticle 210 on the screen.

Compass 119 defines, generates, and animates Compass 230.

Figure 6:
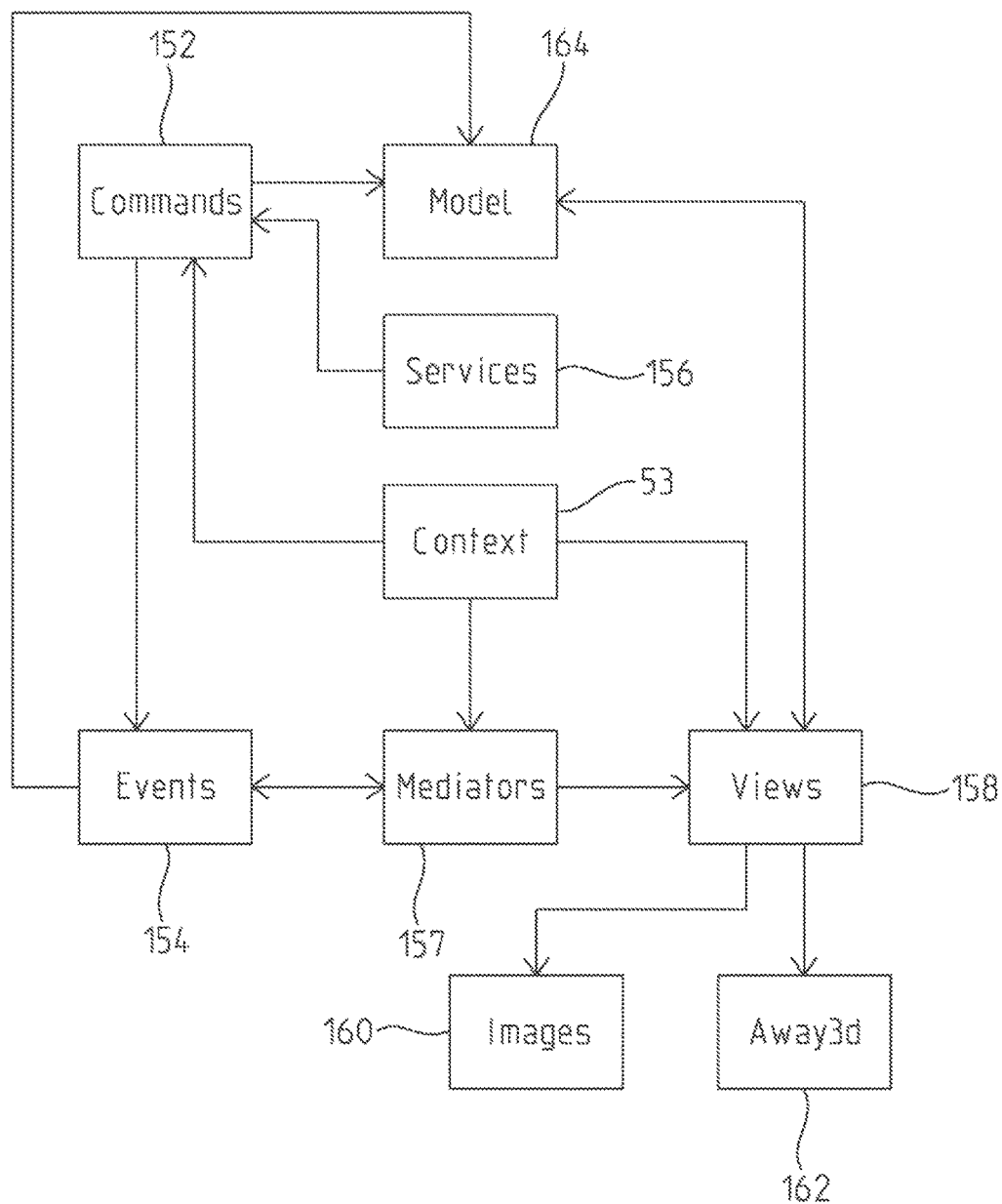
FIG. 6 shows a high-level overview of the software architecture in accordance with one embodiment of the invention.
Figure 7:
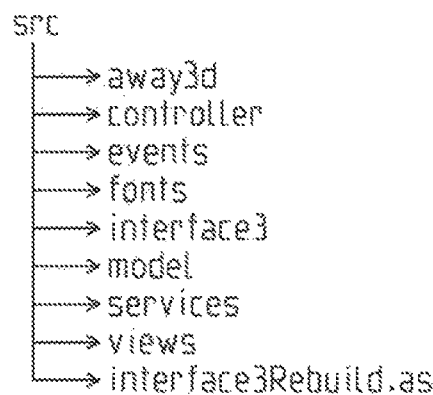
FIG. 7 shows a high-level view of the directories of the code of one embodiment of the invention.
Figure 8:
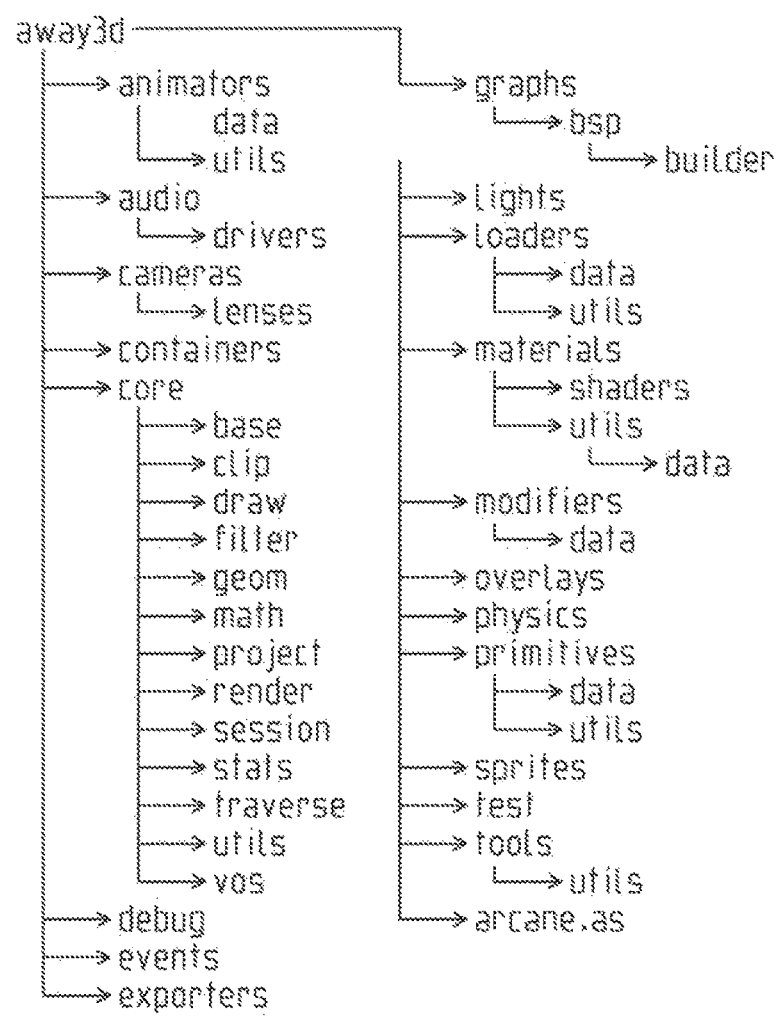
FIG. 8 shows the directory tree of the contents of the away3d directory.
Figure 9:
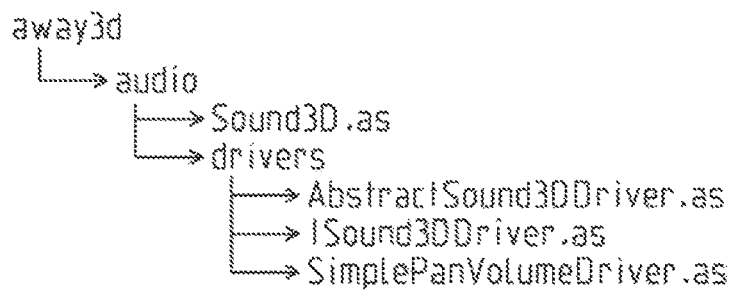
FIG. 9 shows the contents of the audio directory in the away3d directory.
Figure 10:
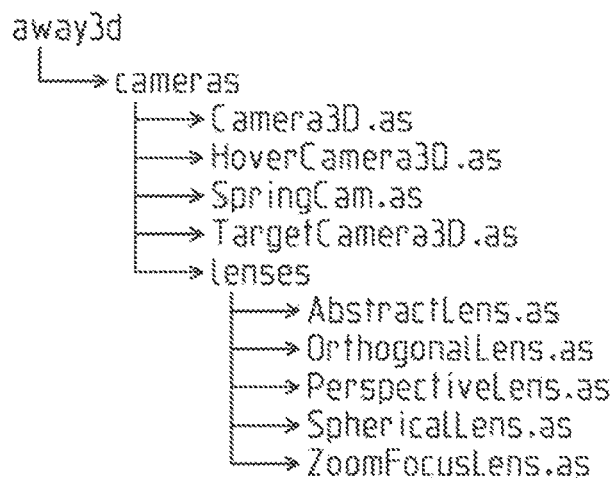
FIG. 10 shows the contents of the cameras directory in the away3d directory.
Figure 11:
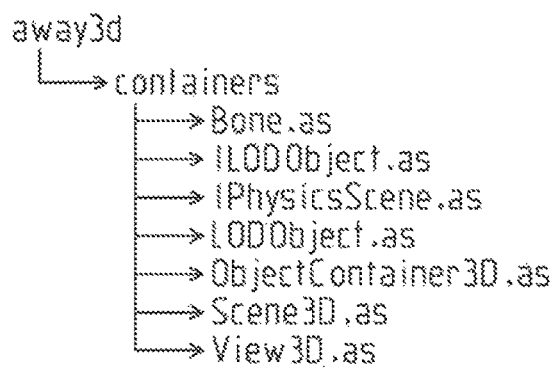
FIG. 11 shows the contents of the containers directory in the away3d directory.
Figure 13:
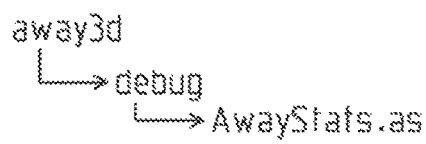
FIG. 13 shows the contents of the debug directory in the away3d directory.
Figure 12:
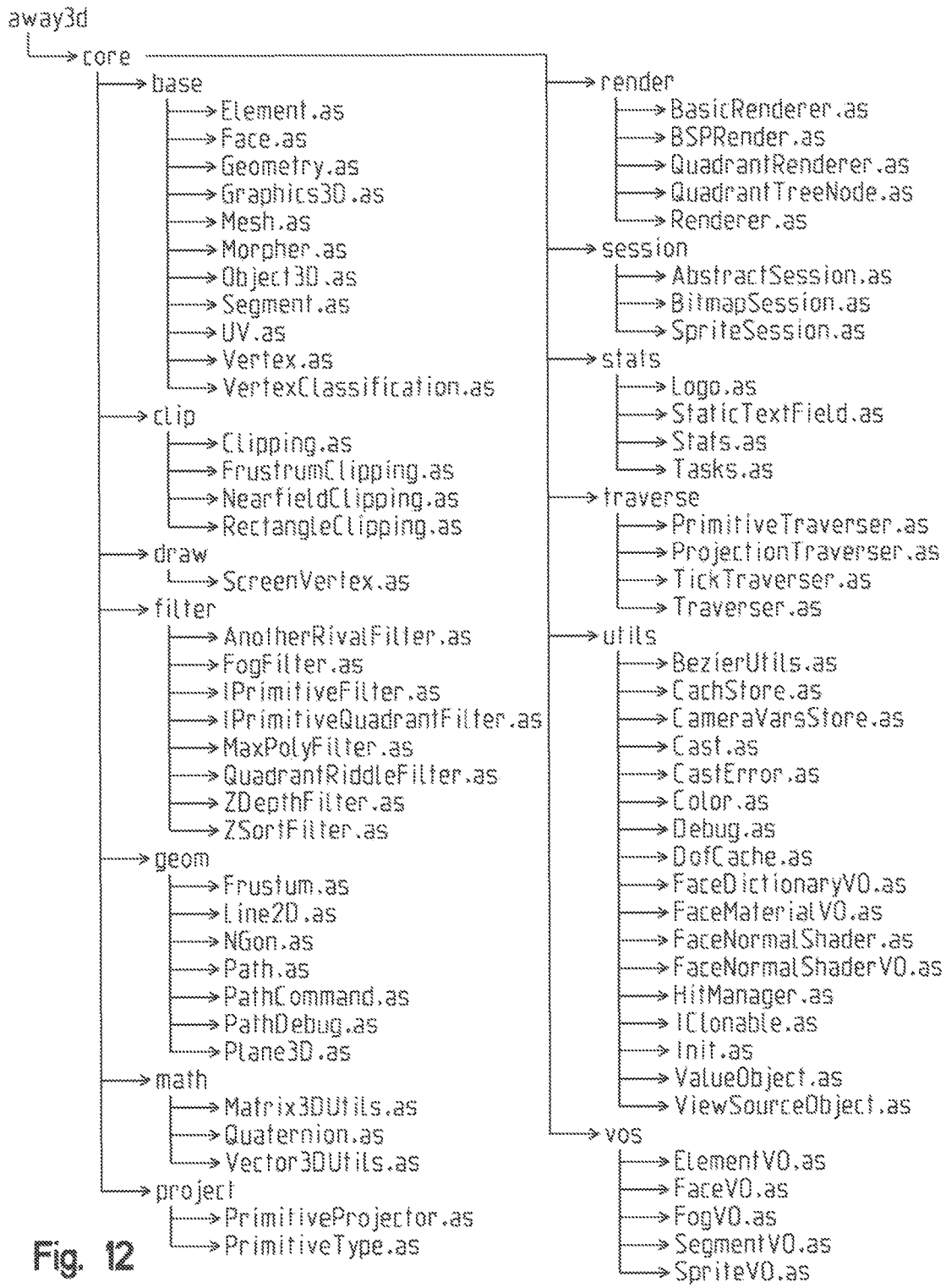
FIG. 12 shows the contents of the core directory in the away3d directory.
Figure 14:
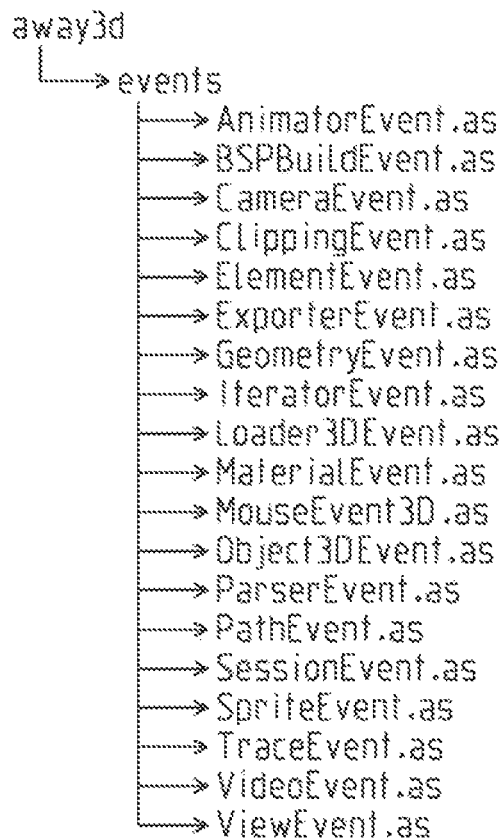
FIG. 14 shows the contents of the events directory in the away3d directory.
Figure 15:
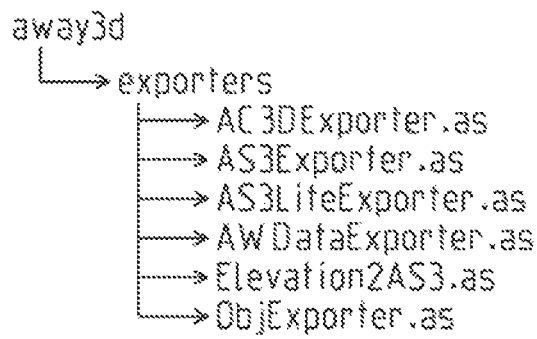
FIG. 15 shows the contents of the exporters directory in the away3d directory.
Figure 16:
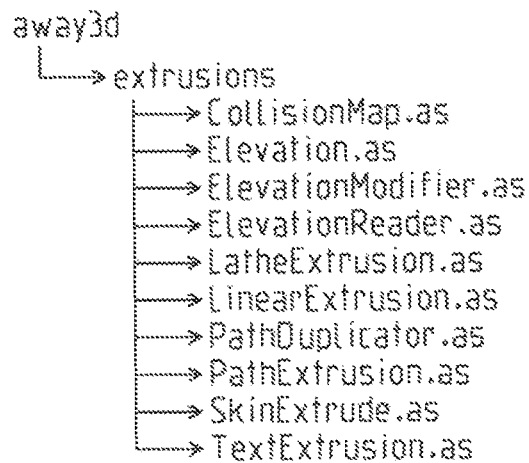
FIG. 16 shows the contents of the extrusions directory in the away3d directory.
Figure 17:
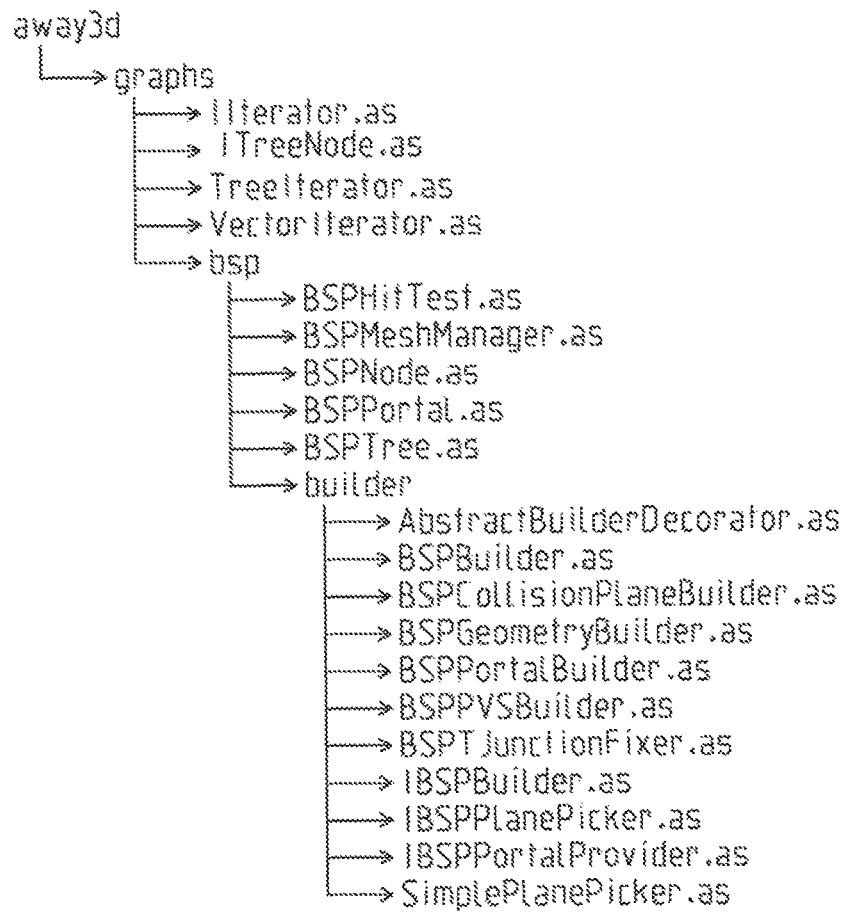
FIG. 17 shows the contents of the graphs directory in the away3d directory.
Figures 18, 19:
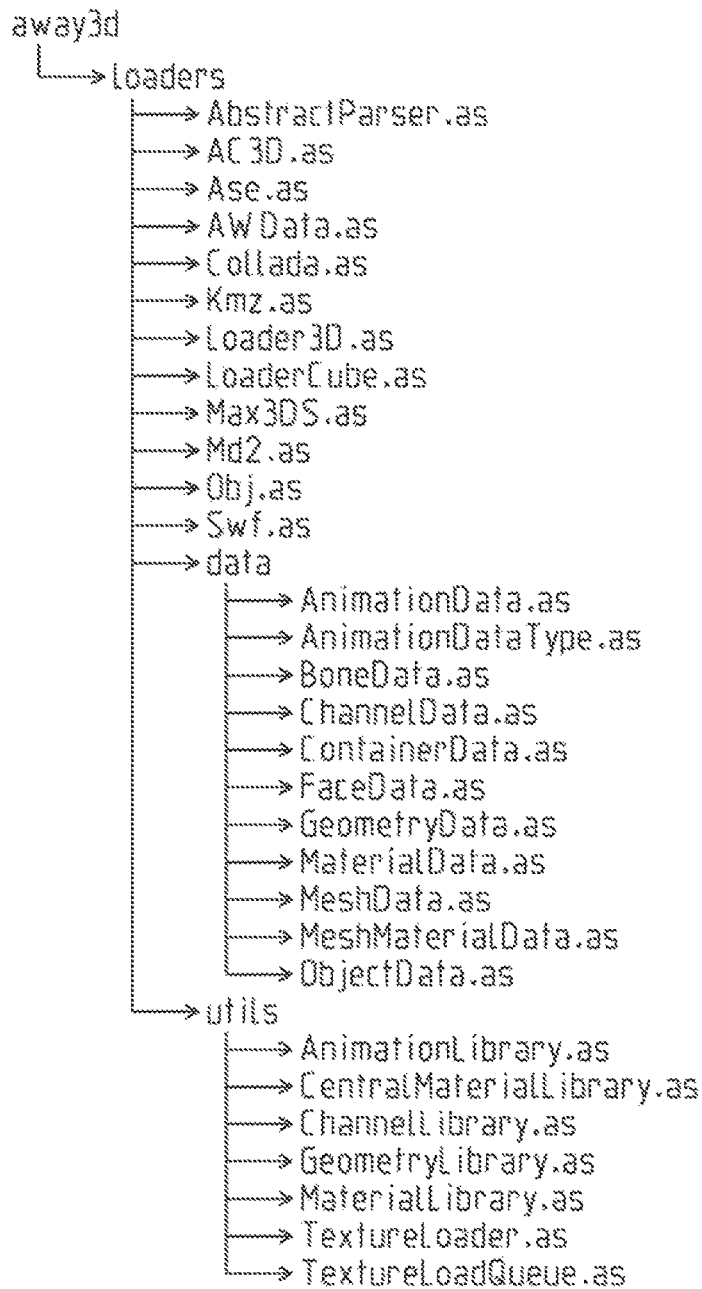
FIG. 18 shows the contents of the lights directory in the away3d directory.
FIG. 19 shows the contents of the loaders directory in the away3d directory.
Figure 20:
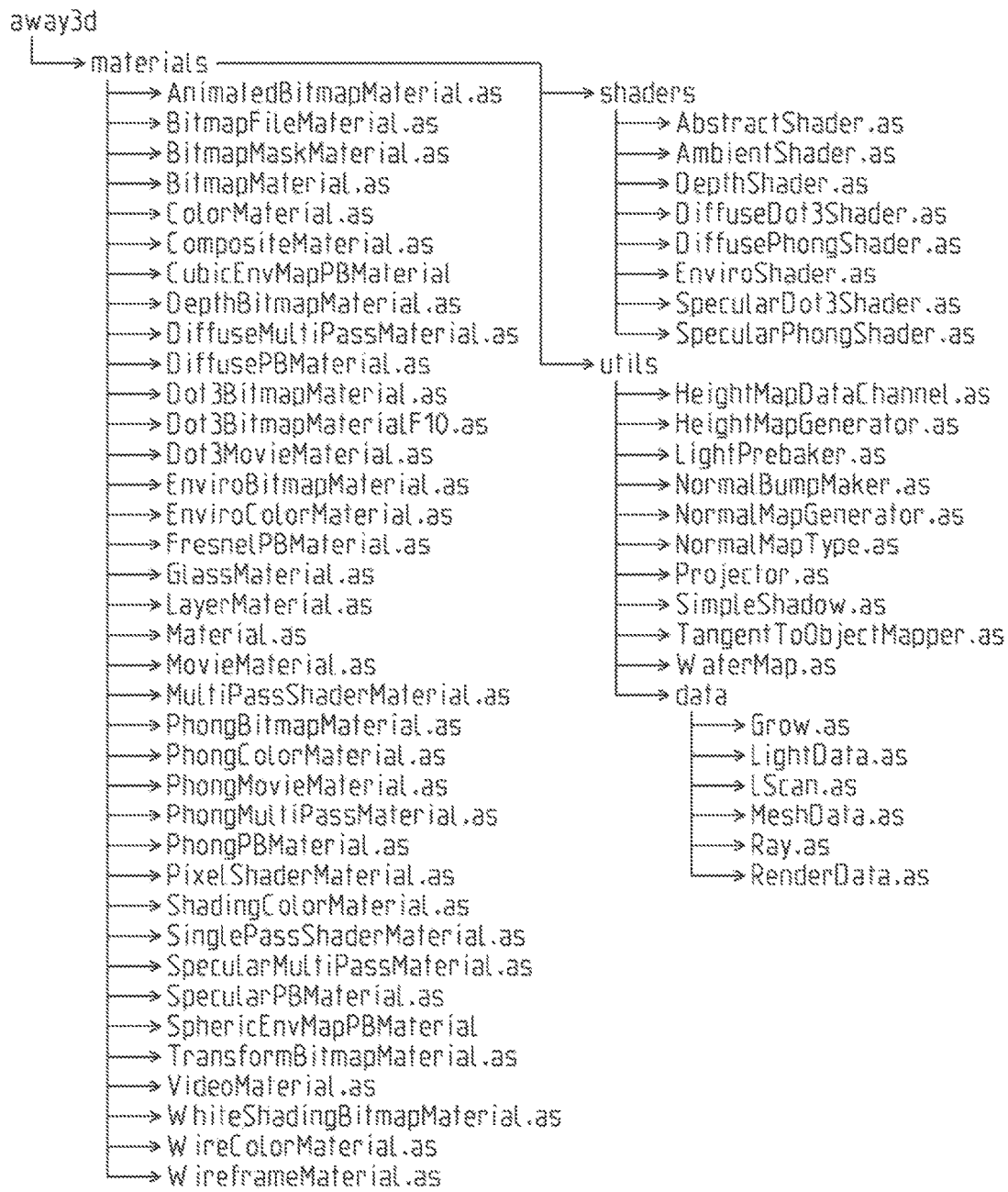
FIG. 20 shows the contents of the materials directory in the away3d directory.
Figure 21:
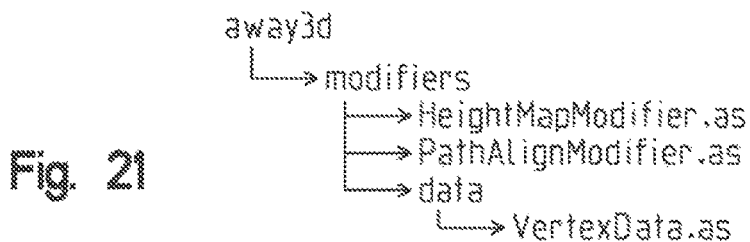
FIG. 21 shows the contents of the modifiers directory in the away3d directory.
Figure 22:
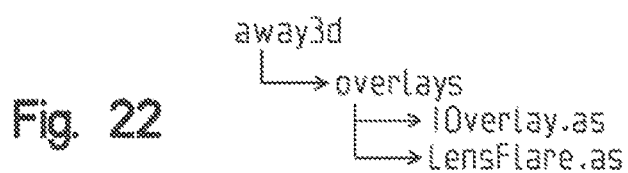
FIG. 22 shows the contents of the overlays directory in the away3d directory.
Figure 23:
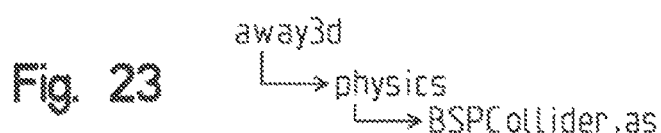
FIG. 23 shows the contents of the physics directory in the away3d directory.
Figure 25:
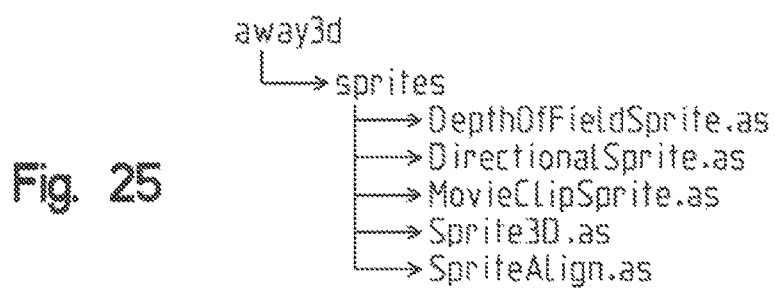
FIG. 25 shows the contents of the sprites directory in the away3d directory.
Figure 26:
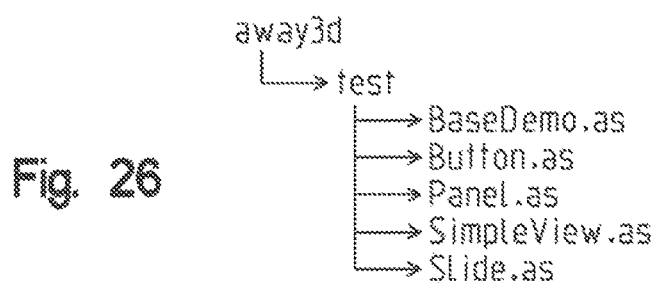
FIG. 26 shows the contents of the test directory in the away3d directory.

FIG. 6 shows a functional diagram of computer software modules for a system in accordance with one embodiment of the invention. Context 53 initializes dependency injection and other utilities. It is the beginning of the application. Context 53 initializes the Commands 152 and matches Mediators 157 with Views 158. Commands 152 represent individual actions that the application can perform. Commands 152 initialize Events 154 and Model 157. In this embodiment, Commands 152 consists of StartupCommand 51 and NemaParseCommand 63.

Events 154 are used to pass parameters to event listeners when an event occurs. Events 154 in this embodiment include AzUpdateEvent 69, ElUpdate Event 71, FOVEvent 73, CameraUpdateEvent 75, TargetUpdateEvent 77, NemaUpdateEvent 59, and FeedbackMessage 81.

Event, e.g., 154, are passing parameters, e.g., 81, to Mediators 157 which in turn are stored in Model 164 and passed to Views 158 by Mediators 157. Model 164 stores data and represents the current state of the application. Interface3Model 85 stores parameters including azimuth, elevation, system mode, bit status, tracker mode, video sensor, sensor type, field of view, current zoom, and range.

Mediators 157 manage data between the application view components, Views 158, and other objects within the application. As shown in FIG. 5, there are several Mediators which interact with the Views, each keeping track of a different Event 154 and parameter, which is then used to update the appropriate View 158. Mediators 157 include Interface3Mediator 83, Gimble3DMediator 85, FOVBarMediator 87, GimbleUIMediator 89, ReticleMediator 91, SystemStateMediator 93, TargetUIMediator 95 and TargetDistanceMediator 97.

Views 158 are viewable components that contain methods that can be called by the Mediators 157. Views 158 interact with Images 160 and Away3d 162 to draw the images and text seen on the screen. Views 158 also retrieve the data from the Model 164 to display on the screen. In this embodiment, Views 158 include ArrowIndicator (defines characteristics of compass arrow generation), Boat (displays boat graphic), Compass 119, FOVBar 107, Gimble3D 105, GimbleUI 109, Interface3 101, Reticle 111, SystemStateUI 113, TargetDistanceView 117, and TargetUI 115.

Services 156 are used to communicate with programs and/or devices outside the application to get data for the models. In this embodiment CameraService defines the video stream settings and FLIRService 55 sets up and communicates with the FLIR Camera 57.

Images 160 contain basic images such as buttons. Away3d 162 contains the classes that draw on the display and show the video.

The Robotlegs architecture of this embodiment also includes several plug-ins, including Away3D, TweenLite, and TweenMax. Away3D is an open source 3D engine for Adobe Flash used to render 3D models and perform additional 3D related tasking. Away3D was used in the 3I software to implement 3D models such as the camera and Taurus graphic. TweenLite is a fast, lightweight, tweening engine that handles the movement of graphics and animations. TweenMax is a fast, lightweight, tweening engine with additional capabilities and handles the movement of graphics and animations.

FIGS. 7-28, 31, 39, 41, 43, 45, and 48 show various views of an exemplary file structure of example code of one embodiment of the invention.

FIGS. 29 and 30 show representations of the code in the controller directory.

FIGS. 32-38 show representations of the code in the events directory.

FIGS. 40, 42, 44A and 44B show representations of the code in the fonts, interface3 and model directories.

FIGS. 46-47 show representations of the code in the services directory.

FIGS. 49-64 show representations of the code in the views directory.

FIGS. 65A, 65B and 65C show a representation of the Interface3Rebuild.

Although the invention has been described in detail with reference to certain preferred embodiments, variations and modifications exist within the spirit and scope of the invention as described and defined in the following claims.

The invention claimed is:

1. A system that generates standardized electro-optic device (EOD) graphical user interface (GUI) overlays including GUI overlays having outputs common to different EODs in a cognitive load reducing and field of view enhancing format comprising:
    one or more EODs that each outputs a first plurality of EOD outputs comprising different types of EOD device outputs common to said one or more EODs;
    a processor;
    a one or more storage media;
    at least one display designed to display a plurality of GUIs comprising said EOD GUI overlays;
    a software program stored on at least one said storage media that is read by said processor to operate one more sections of said system to receive said first plurality of EOD outputs and produce or display said plurality of GUIs displaying different GUI elements and the text associated with said first plurality of EOD outputs, wherein said program comprises;
        a library of device drivers that receives said first plurality of EOD outputs and generates device driver outputs comprising a first plurality of program outputs that are stored on said one more storage media, wherein said first plurality of program outputs are each respectively associated or correlated with different types of said first plurality of EOD outputs;
        a library of GUI view generators (GVG) that each displays one of a plurality of said GUI elements and text elements, wherein each of said GVG generates one type of said GUI element or said text respectively associated with each said outputs common to different EODs at a respective plurality of same sections or locations within said plurality of GUI overlays associated with different EODs and GUI overlay application format categories including equipment item targeting operations and non-targeting surveillance operations, wherein each CVG will generate at least some of said GUI elements and said text at a periphery of a field of view of each of the EODs, wherein at least some of said GUI elements and said text are grouped based on related function or operation;
    a plurality of GUI element mediators, wherein each of the GUI element mediators receives mediator inputs comprising said first plurality of program outputs or mediator inputs derived from said first plurality of program outputs each respectively associated with each of said different types of EOD outputs, wherein said GUI element mediators call or execute an associated one of said GVGs associated with said different types of EOD outputs;
    a video data grabber;
    wherein the software program is executed by the processor and stored on the at least one storage media;
    wherein said video data grabber receives video from each EOD;
    wherein said video is combined with said GUI overlays and shown on the display.

2. A computer program comprising:
    a plurality of processing sequences stored on a non-transitory computer readable medium comprising:
        a first processing sequence is adapted to detect a plurality of device types;
        a second processing sequence is adapted to select a device driver from a library of device drivers that is configured for a detected device;
        a third processing sequence is adapted to receive data from the detected device;
        a fourth processing sequence is adapted to translate data from the detected device to produce translated data, said fourth processing sequence comprises a plurality of mediator modules that each receive a different output from each of said device drivers based on category of device outputs that said drivers translate;
        a fifth processing sequence is adapted to use said translated data to create a standardized GUI overlay, wherein said fifth processing sequence comprises a plurality of view modules that each generate graphical user interface elements associated with each of said different output from each said device driver;
        a sixth processing sequence is adapted to receive video from the detected device; and
        a seventh processing sequence is adapted to combine the video with the standardized GUI overlay and display on a monitor;
    wherein said fifth processing sequence uses said translated data to create a standardized GUI overlay which displays alphanumeric and graphical interface information using standardized GUI elements comprising symbology associated with each category of EOD output in said GUI, wherein said symbology is positioned to minimize obstruction of a center section of a field of view of a target generated from an electro-optic device, said symbology is grouped associated with similar classes of said translated data, said similar classes of said translated data comprise device information including sensor data display information, and target information, the minimization of obstruction of said field of view comprising placing at least a portion of similar classes of data on a periphery of said GUI and grouping said similar classes of device output data associated with function together into portions of said periphery comprising a lower left and lower right hand section of said GUI.

3. A system for interfacing multiple systems in a common user interface, comprising:
a non-transitory storage medium storing a plurality of machine readable processing sequences that operate a processor and the system for interfacing multiple systems in a common user interface comprising:
a sensor interface processing sequence comprising instructions that detect one or more electro-optic devices (EOD) comprising one or more sensors that generate a plurality of sensor outputs respectively associated with each EOD and select a device driver from a plurality of device drivers to interface with the one or more sensors;
a plurality of event update processing sequences comprising
a first event processing sequence is adapted to receive and update sensor azimuth information provided by a first sensor output;
wherein a second event processing sequence is adapted to receive and update sensor elevation information provided by a second sensor output;
wherein a third event processing sequence is adapted to receive and update field-of-view of the EOD information provided by a third sensor output;
wherein a fourth event processing sequence is adapted to receive and update camera or video sensor type information provided by a fourth sensor output;
wherein a fifth event processing sequence is adapted to receive and update range information provided by a fifth sensor output;
wherein a sixth event processing sequence is adapted to receive and update error messages provided by a sixth sensor output;
a plurality of mediator modules comprising Interface3Mediator, Gimble3DMediator, FOVBarMediator, GimbleUIMediator, ReticleMediator, SystemStateUIMediator, TargetUIMediator and TargetDistanceMediator, wherein each of said plurality of sensor outputs comprising said first through sixth sensor outputs are respectively associated with one of said mediator modules based on a related function or category of event;
a plurality of GUI view generator (GVG) processing sequences comprising
ArrowIndicator, Compass, FOVBar, Gimble3D, GimbleUI, Interface3, Reticle, SystemStateUI, TargetDistanceView, and TargetUI, wherein each of said GVGs are called by one of said mediator modules so that outputs of said GVGs are the same regardless of what type of EOD is generating said plurality of sensor outputs;
wherein said ArrowIndicator is adapted to define, generate, and animate an orientation element;
wherein said Compass is adapted to define, generate and animate the compass components;
wherein said FOVBarMediator is adapted to wait for an update to field-of-view of the EOD and then update the scale of a field-of-view mask in FOVBar which is adapted to define, generate and animate field-of-view components to be displayed;
wherein said Gimble3DMediator is adapted to wait for updates to azimuth and elevation information and then update the azimuth and elevation in Gimble3D which is adapted to define, generate, and animate camera graphics to be displayed;
wherein said GimbleUIMediator is adapted to interact with the GimbleUI which is adapted to define and generate following craft data;
wherein said Interface3Mediator is adapted to wait for an update range information and interacts with Interface3 which is adapted to create GUI objects displayed;
wherein said ReticleMediator is adapted to interact with Reticle to display a targeting reticle;
wherein said SystemStateMediator is adapted to wait for an update to camera type information and then to update camera type in SystemStateUI which is adapted to define and generate Camera Status Icons;
wherein said TargetDistanceMediator is adapted to wait for an update to range information and then to update range values in TargetDistanceView which is adapted to define and generate target reticle range data;
wherein said TargetUIMediator is adapted to wait for an update to range information and then to update the range information in TargetUI which is adapted to define and generate target history data.

4. A system as in claim 1, further comprising at least one equipment item the EOD is coupled with or operates in conjunction with that has a common aim point.

5. A system as in claim 4, wherein said equipment item comprises a projectile launcher.

6. A system as in claim 4, wherein said equipment item is a sensor pod with a plurality of sensors including at least one said EOD.

7. A system as in claim 4, wherein said plurality of GUI overlays including at least one overlay for each of said at least one equipment item and said at least one EOD combination.

8. A system as in claim 7, wherein each of said GUI overlays has said GUI elements in a same location of said display.

9. A system as in claim 1, wherein at least some of said GUI elements comprise GUI symbology that is grouped in at least some of said GUI overlay application format categories with said text comprising device information, including sensor data display information, and target information.

10. A system as in claim 1, wherein said GUI elements and said text are formatting into at least some of said GUI overlays as genus and species groupings, the genus groupings comprise platform data, target or field of view object data, EOD orientation data, wherein said EOD orientation data species comprises orientation of a field of view with regard to a georeference frame.

* * * * *